United States Patent
Ohtsuka

Patent Number: 6,088,765
Date of Patent: *Jul. 11, 2000

[54] REMOVABLE MEDIUM DATA STORAGE APPARATUS, OPTICAL DISK APPARATUS AND DATA TRANSFER CONTROL METHOD

[75] Inventor: Masaoki Ohtsuka, Kawasaki, Japan

[73] Assignee: Fujitsu Limited, Kawasaki, Japan

[*] Notice: This patent is subject to a terminal disclaimer.

[21] Appl. No.: 09/093,121

[22] Filed: Jun. 8, 1998

Related U.S. Application Data

[62] Division of application No. 08/565,118, Nov. 30, 1995, Pat. No. 5,829,017.

[30] Foreign Application Priority Data

Mar. 15, 1995 [JP] Japan ................................. 7-055717

[51] Int. Cl.[7] .................................................. G06F 12/00
[52] U.S. Cl. .......................... 711/113; 711/137; 711/156; 711/115
[58] Field of Search ................................. 711/113, 137, 711/156, 144, 115

[56] References Cited

U.S. PATENT DOCUMENTS

| | | | |
|---|---|---|---|
| 4,870,565 | 9/1989 | Yamamoto et al. | 711/113 |
| 4,956,803 | 9/1990 | Tayler et al. | 711/113 |
| 5,127,094 | 6/1992 | Bono | 711/2 |
| 5,418,921 | 5/1995 | Cortney et al. | 711/114 |
| 5,428,787 | 6/1995 | Pineau | 711/137 |
| 5,577,224 | 11/1996 | DeWitt et al. | 711/118 |
| 5,581,724 | 12/1996 | Belsan et al. | 711/114 |
| 5,581,740 | 12/1996 | Jones | 395/500 |
| 5,586,291 | 12/1996 | Lasker et al. | 711/113 |
| 5,590,298 | 12/1996 | Kawamoto | 711/3 |
| 5,600,817 | 2/1997 | Macon, Jr. et al. | 711/137 |
| 5,606,684 | 2/1997 | Nakano et al. | 711/114 |
| 5,623,608 | 4/1997 | Ng | 711/137 |

FOREIGN PATENT DOCUMENTS

| | | |
|---|---|---|
| 62-274446 | 11/1987 | Japan . |
| 1166240 | 6/1989 | Japan . |
| 2122488 | 5/1990 | Japan . |

*Primary Examiner*—Reginald G. Bragdon
*Attorney, Agent, or Firm*—Greer, Burns & Crain, Ltd.

[57] ABSTRACT

A removable medium data storage apparatus includes a medium loading mechanism for loading a medium, a read circuit for reading data, a buffer for temporarily storing read data, and an MPU. The MPU includes at least a read pattern table for storing a read pattern specified by a read command issued by a host apparatus, the read pattern being formed of a block address and a processed block size, so that data can be prefetched according to the read pattern each time the medium is loaded.

5 Claims, 17 Drawing Sheets

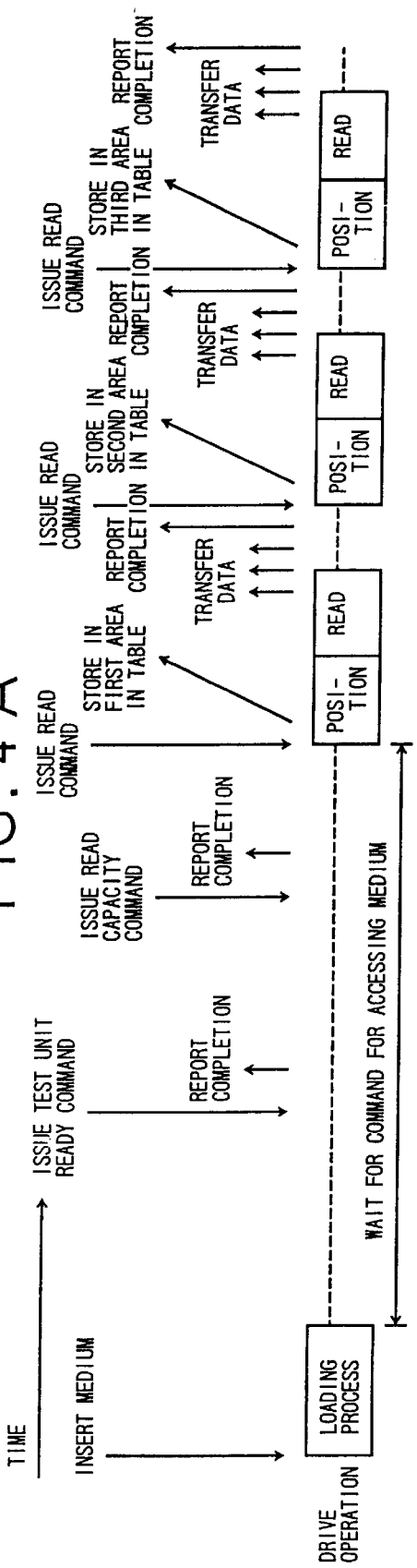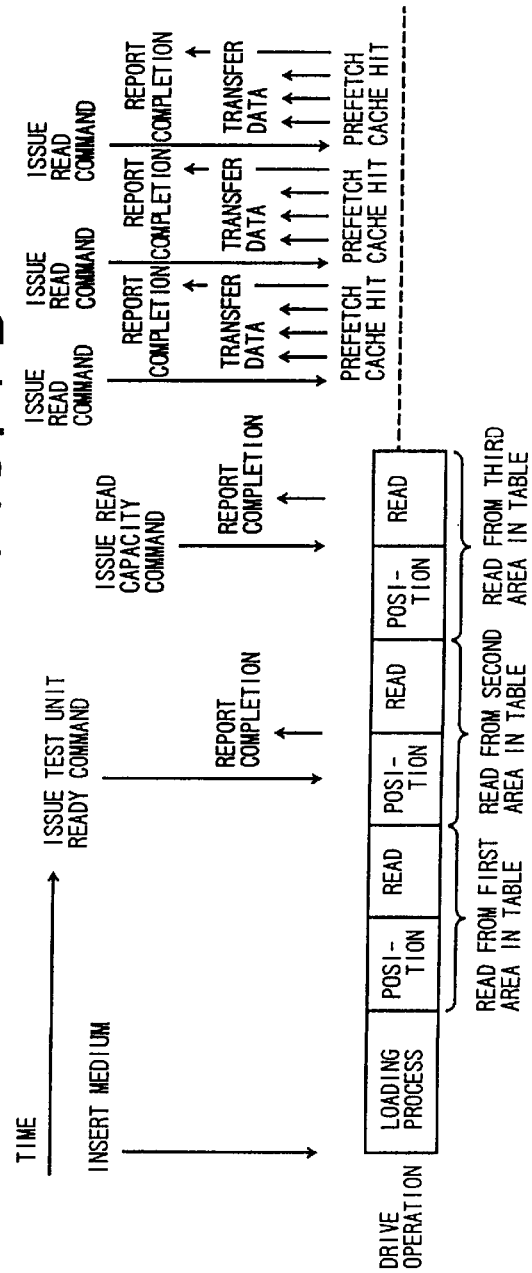
FIG. 4A
FIG. 4B

| | ADDRESS | PROCESSED BLOCK SIZE | VALIDITY FLAG |
|---|---|---|---|
| FIRST COMMAND INFORMATION SET → | A 1 | B 1 | F 1 |
| SECOND COMMAND INFORMATION SET → | A 2 | B 2 | F 2 |
| THIRD COMMAND INFORMATION SET → | A 3 | B 3 | F 3 |
| . . . | . . . | . . . | . . . |
| NTH COMMAND INFORMATION SET → | A n | B n | F n |

| | ADDRESS | PROCESSED BLOCK SIZE | VALIDITY FLAG |
|---|---|---|---|
| FIRST COMMAND INFORMATION SET ----> | 0 | 1 | 1 |
| SECOND COMMAND INFORMATION SET ----> | 100 | 1 | 1 |
| THIRD COMMAND INFORMATION SET ----> | 20 | 2 | 1 |
| FOURTH COMMAND INFORMATION SET ----> | 0 | 0 | 0 |

| | ADDRESS | PROCESSED BLOCK SIZE | VALIDITY FLAG |
|---|---|---|---|
| FIRST COMMAND INFORMATION SET ----> | 0 | 1 | 1 |
| SECOND COMMAND INFORMATION SET ----> | 20 | 2 | 1 |
| THIRD COMMAND INFORMATION SET ----> | 100 | 1 | 1 |
| FOURTH COMMAND INFORMATION SET ----> | 0 | 0 | 0 |

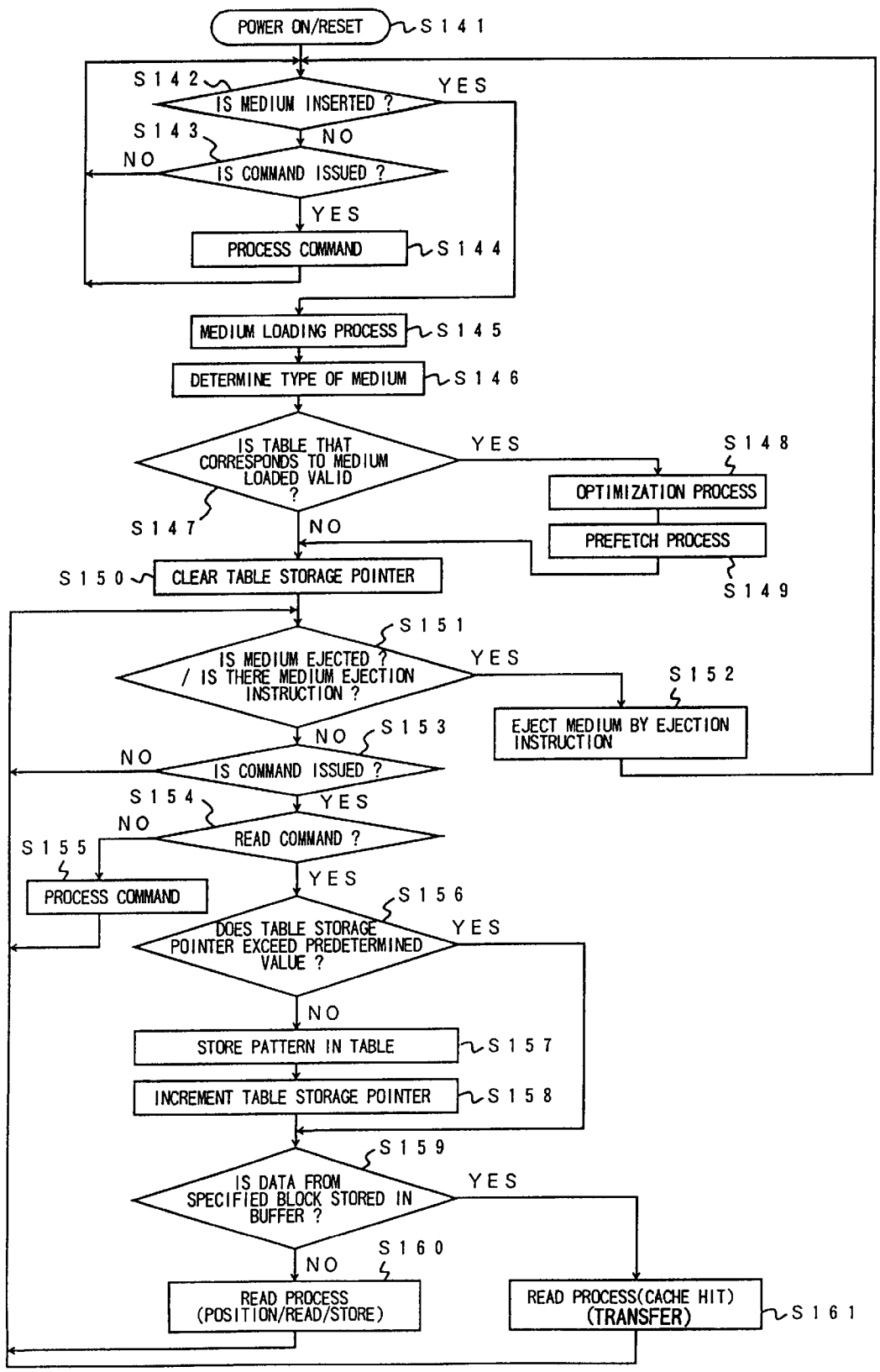

REMOVABLE MEDIUM DATA STORAGE APPARATUS, OPTICAL DISK APPARATUS AND DATA TRANSFER CONTROL METHOD

This is a divisional of application Ser. No. 08/565,118, filed Nov. 30, 1995 which issued on Oct. 27, 1998 as U.S. Pat. No. 5,829,017.

BACKGROUND OF THE INVENTION

1. Field of the Invention

The present invention relates to an interchangeable medium data storage apparatus for reading data after the loading of an interchangeable medium.

In recent information processing systems constituted of a host apparatus equipped with an interchangeable medium data storage apparatus, there are demands for high-speed access between the host apparatus and the storage apparatus. For this reason, it is requested that data is read at a high speed after a medium is loaded, irrespective of the type of medium or the type of OS (operating system).

2. Description of the Prior Art

In storage apparatuses such as a magnetic disk apparatus, an optical disk apparatus and a compact disk read-only memory (CD-ROM) apparatus, wherein the medium is interchangeable, there is created a time in which the storage apparatus waits for a command from the host apparatus after defect management information and the like are read from a medium loaded in the apparatus. Any process is started only after the command is received.

That is, in a computer system incapable of automatically recognizing the mounting of a medium, the medium cannot be accessed until an operator performs a file access after the medium is loaded. When the operator requests an access to a file on the medium, the OS first reads system management information and then carries out a process relating to a file operation requested by the operator.

According to some OSs, the host computer issues a predetermined command at regular intervals, and a process (such as reading of system management information) relating to the command is executed after a medium is loaded.

FIG. 1 is a flowchart of a conventional process carried out when a medium is loaded in a storage apparatus. Referring to FIG. 1, when the power is turned ON or a reset operation is initiated (step S201), a determination is made using a sensor equipped in a medium loading mechanism as to whether or not a medium is inserted into the storage apparatus (S202). When it is found that the medium is not inserted, a determination is made as to whether or not a command is issued (S203). When it is found that a command is issued, that command is processed (S204).

When it is found that a medium is inserted, a medium loading process including the driving of a spindle motor into rotation is performed (S205). A determination is made as to whether or not the medium is ejected, or whether or not there is an instruction to eject the medium (S206). When there is an instruction to eject the medium, the medium is ejected (S207).

When the medium has not been ejected, a determination is made as to whether or not the host apparatus issued a command (S208). When it is found that no command is issued, the storage apparatus waits for a command. When a command is issued, a determination is made as to whether or not the issued command is a read command (S209). When the issued command is not a read command, that is, for example, when the issued command is a write command, an associated command process such as a writing process is carried out (S210), whereupon the control is returned to step S206.

When the issued command is a read command, that is, for example, a read command for reading OS management information, a read process performed such that a read head is positioned to an address specified by the read command, data is read and stored in a buffer, and the data is transferred from the buffer to the host apparatus (S211). The control is then returned to step S206.

In this way, the OS management information or the like is read only after a read command is issued from the host apparatus.

The prior art described above is characterized by a slow response to an access from the host apparatus because a mechanical operation including a seeking operation of the head is carried out after a read command is issued from the host apparatus after the medium is loaded. Hence, the prior art has a problem in that a speedier access cannot be attained. The problem is particularly noticeable in an optical disk apparatus because adjustment of an optical head including an adjustment of an optical power, tracking and a focusing is required after the medium is loaded.

There are some known methods designed to attain a high speed access between the host apparatus and the storage apparatus, including the methods disclosed in Japanese Laid-Open Patent Application No. 62-27446, Japanese Laid-Open Patent Application No. 1-166240 and Japanese Laid-Open Patent Application No. 1-122488.

Japanese Laid-Open Patent Application No. 62-27446 discloses a method whereby a non-resident program is read in accordance with a command from a central processing unit (host apparatus) at the start of the system and transferred to a memory circuit constituted of a random access memory (RAM). According to this method, a seek operation and the like are performed only when a command from the central processing unit is received after the loading of the medium, resulting in a slow response to an access performed after the loading of the medium.

Japanese Laid-Open Patent Application No. 1-166240 discloses a method whereby a program stored in a non-volatile memory (magnetic disk) is transferred from the non-volatile memory to a main memory without being routed to a work memory (buffer). In accordance with load information file read from the non-volatile memory. Like the conventional method described above, the seek operation and the like are performed only after a read request for the load information file is issued, resulting in a slow response to an access after the loading of the medium.

Japanese Laid-Open Patent Application No. 1-122488 discloses a method whereby data in a predetermined address is read when the disk is loaded. The seek operation and the like are performed by access means in response to a read command from the host system. There is a problem in that a certain period of time is wasted in waiting for a command and a time is further required to issue the read command. An additional problem with this method is that it is impossible to adapt to a change in a medium format etc. or a change in the operating system.

SUMMARY OF THE INVENTION

Accordingly, an object of the present invention is to provide an interchangeable medium data storage apparatus, an optical disk apparatus and a data transfer control method, wherein the aforementioned problems are eliminated.

Another and more specific object of the present invention is to provide an interchangeable medium data storage apparatus, an optical disk apparatus and a data transfer control method, wherein a a high-speed access to the medium after the loading thereof is attained, irrespective of the type of medium and the operating system.

In order to achieve the aforementioned objectives, the present invention provides an interchangeable medium data storage apparatus in which a recording medium is interchangeable, and data transfer between the interchangeable medium data storage apparatus and a host apparatus is carried out, the interchangeable medium data storage apparatus comprising: read means for reading data from predetermined addresses of the recording medium specified by a read command from the host apparatus, address information storage means storing address information specified by the read command for the recording medium; data storage means storing the data read by the read means from the recording medium in accordance with the address information stored in the address information storage means; and transfer control means transferring the data stored in the data storage means to the host system in accordance with the address information specified by the read command.

According to the interchangeable medium data storage apparatus of the present invention, a quick response to a read command from a host apparatus is attained and a high-speed access to the recording medium after the loading of the medium is attained.

The present invention also provides an optical disk medium storage apparatus in which a optical disk medium is interchangeable, and data transfer between the optical disk medium storage apparatus and a host apparatus is carried out, the optical disk medium storage apparatus comprising: reproduction means for reading data from predetermined addresses of the optical disk medium specified by a read command from the host apparatus, identification information acquisition means acquiring identification information for identifying the optical disk medium loaded into the optical disk medium storage apparatus; address information storage means storing the identification information acquired by the identification information acquisition means and address information specified by the read command for the optical disk medium; data storage means storing the data read by the reproduction means from the optical disk medium in accordance with the address information stored in the address information storage means; and transfer control means transferring the data stored in the data storage means to the host system in accordance with the identification information and in accordance with the address information specified by the read command.

According to the optical disk medium storage apparatus of the present invention for an interchangeable medium data storage apparatus, it is possible to realize an optical disk apparatus in which a quick response to a read command from a host apparatus is attained and a high-speed access to the optical disk medium after the loading of the medium is attained.

In order to achieve the aforementioned objectives, the present invention provides a data transfer control method for an interchangeable medium data storage apparatus in which a recording medium is interchangeable, for transferring data read from the recording medium in accordance with a read command from a host apparatus, the data transfer control method comprising the steps of: a) sequentially storing address information, for the recording medium, specified by the read command from the host apparatus; b) reading, when the data that corresponds to the address information specified by the read command is not stored in data storage means, the data from the recording medium and transferring the data to the host apparatus; and c) transferring, when the address information is stored and invalidated in the address information storage means and the data that corresponds to the address information is stored in the data storage means in advance, the data in the data storage means to the host apparatus.

The present invention also provides a data transfer control method for an interchangeable medium data storage apparatus in which a recording medium is interchangeable, for transferring data read from the recording medium in accordance with a read command from a host apparatus, the data transfer control method comprising the steps of: a) acquiring identification information for identifying the recording medium loaded into the interchangeable medium data storage apparatus; b) sequentially storing address information, for the recording medium, specified by the read command from the host apparatus and the identification information for the recording medium; c) reading, when the data that corresponds to the address information specified by the read command is not stored in data storage means, the data from the recording medium and transferring the data to the host apparatus; and d) transferring, when the address information specified by the read command and the identification information are stored and invalidated in the address information storage means and the data that corresponds to the address information is stored in the data storage means in advance, the data in the data storage means to the host apparatus.

The present invention also provides a data transfer control method for an optical disk apparatus in which an optical disk medium is interchangeable, for transferring data read from said optical disk medium to the host apparatus in accordance with a read command from a host apparatus, said data transfer control method comprising the steps of: a) storing, when said optical disk apparatus receives the read command from the host apparatus, address information specified by said read command for said optical disk medium, in address information storage means; b) reading, when the data that corresponds to said address information specified by said read command is not stored in data storage means, said data from said optical disk medium and transferring said data to the host apparatus; c) transferring, when said address information specified by said read command is stored and invalidated in said address information storage means and the data that corresponds to said address information is stored in said data storage means in advance, the data in said data storage means to the host apparatus; d) reading the data from said optical disk medium in accordance with the address information stored in said address information storage means, in a time frame immediately following the loading of said optical disk medium in which time frame said optical disk apparatus waits for a command from the host apparatus, and storing said data in the data storage means; and e) updating minute by minute the address information stored in said address information storage means.

According to the data transfer control method of the present invention for an optical disk apparatus, a quick response to a read command from a host apparatus is attained and a high-speed access to the recording medium after the loading of the medium is attained.

BRIEF DESCRIPTION OF THE DRAWINGS

Other objects and further features of the present invention will be apparent from the following detailed descriptions when read in conjunction with the accompanying drawings, in which:

FIG. 4A shows a process derived from a read command issued after the power is turned ON (or the apparatus is reset) and the medium is loaded;

FIG. 4B shows a variation of the process shown in FIG. 4A, wherein a prefetch is performed in accordance with the read pattern table 23 storing a block address and a processed block size;

FIG. 5 shows a read pattern table;

FIG. 6 is a flowchart of the process performed when the medium is loaded for the first time after the power is turned ON;

FIG. 14A shows a read pattern tables according to a fourth embodiment of the present invention;

FIG. 14B shows a read pattern table according to the fourth embodiment of the present invention;

FIG. 15 is a flowchart of the process according to the fourth embodiment performed when the medium is loaded;

DESCRIPTION OF THE PREFERRED EMBODIMENTS

Figure 1:
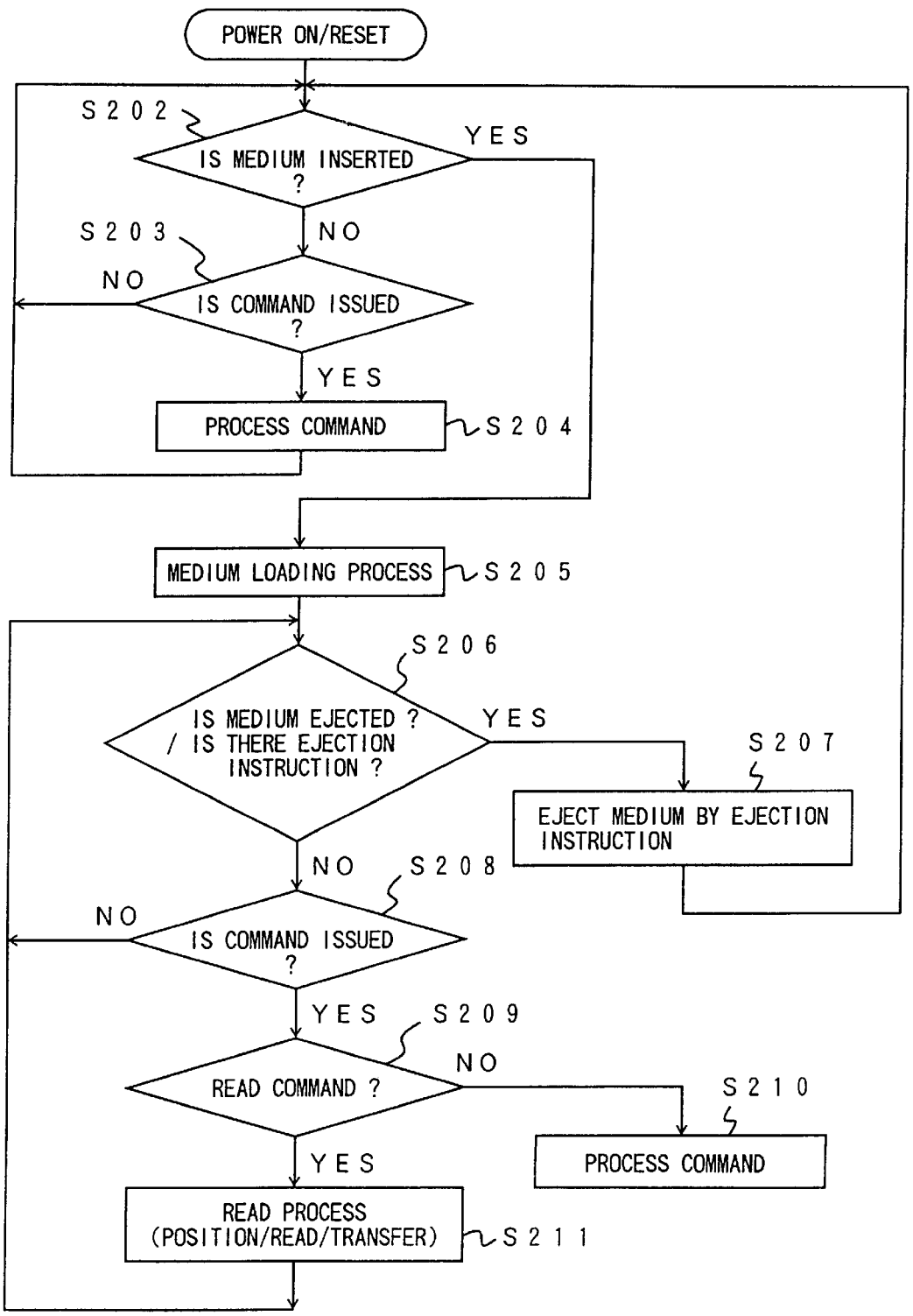
FIG. 1 is a flowchart of a conventional process carried out when a medium is loaded in a storage apparatus.
Figure 2:
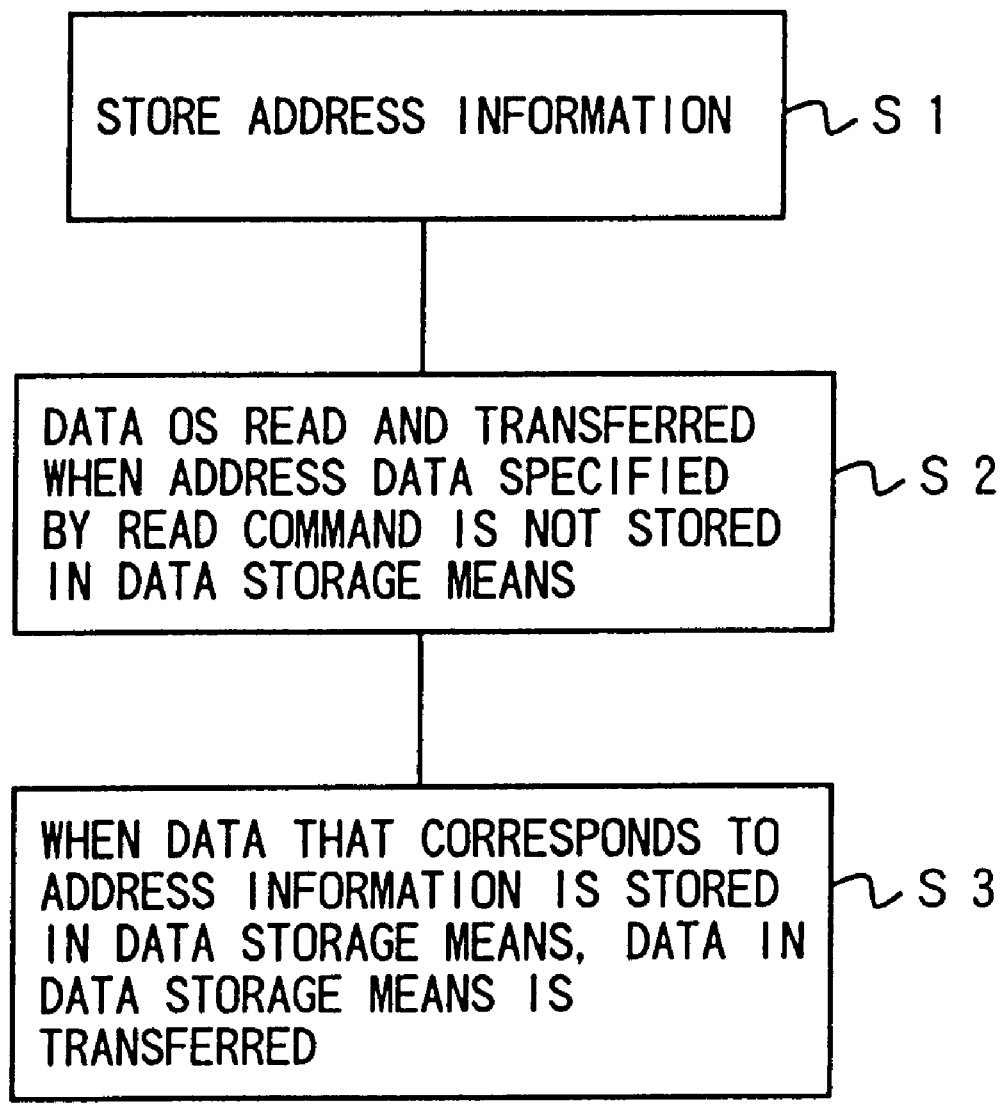
FIG. 2 shows the operating principle of a data transfer control method according to the present invention.

FIG. 2 shows the operating principle of a data transfer control method according to the present invention. Referring to FIG. 2, an interchangeable medium data storage apparatus in which the recording medium is interchangeable reads data from the recording medium in accordance with a read command from a host apparatus, whereupon the data is transferred. Address information specified by the read command from the host apparatus for the recording medium is sequentially written (step S1). When the data that corresponds to the address information specified by the read command is not stored in data storage means, the data is read from the recording medium and transferred (S2). When the address information is stored in the address information storage means and the data that corresponds to the address information is stored in the data storage means in advance, the data in the data storage means is transferred (S3).

Figure 3:
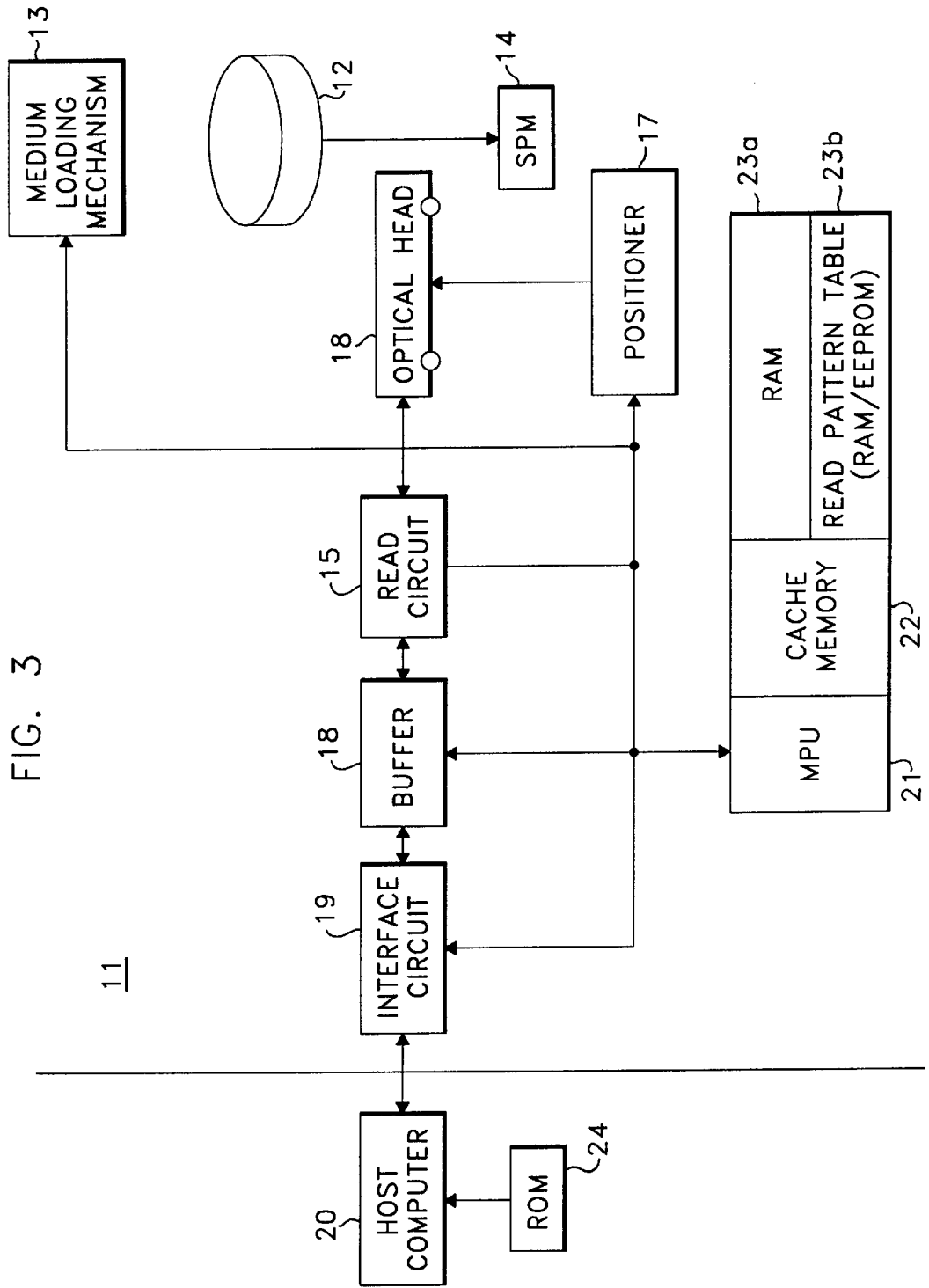
FIG. 3 is a block diagram showing a first embodiment of the present invention.

FIG. 3 is a block diagram showing a first embodiment of the present invention. FIG. 3 shows an optical disk apparatus 11 as an example of an interchangeable medium data storage apparatus. An optical disk 12 is an interchangeable medium. While the optical disk apparatus is taken as an example in the following description, the present invention is equally applicable to a magnetic disk apparatus in which a magnetic disk serves as a recording medium, and a CD-ROM apparatus in which a CD-ROM serves as a medium.

Referring to FIG. 3, the optical disk 12 of the optical disk apparatus 11 is loaded using a medium loading mechanism 13 and rotated at a predetermined speed by a spindle motor (SPM) 14. The medium loading mechanism 13 and the SPM 14 constitute loading means. The medium loading mechanism 13 is equipped with a sensor for detecting the loading of a medium.

Data and the like stored in the medium 12 is read by an optical head 16 controlled by a read circuit 15. The optical head 16 is controlled by a positioner 17 to be positioned so as to read from a relevant block of the medium 12. The read circuit 15, the optical head 16 and the positioner 17 constitute read means or reproduction means.

Data read by the read means is temporarily stored in a buffer 18 (storage means) and transferred to a host computer 20 (host apparatus) via an interface circuit 19. The medium loading mechanism 13, the positioner 17, the read circuit 15, the buffer 18 and the interface circuit 19 are controlled by a microprocessor unit (MPU) 21. The MPU 21 is equipped with identification information acquiring means for acquiring identification information for the optical disk medium 12, managing means for managing the address information such that the address information is either validated or invalidated and transfer control means for transferring data to the host computer 20. The capacity of the buffer 18 may be appropriately set to 512 Kilobytes considering that thirty-two blocks of data requires 256 Kilobytes.

The MPU 21 is equipped with a cache memory 22, a temporary storage memory embodied by a random access memory (RAM) 23a for storing a buffer management table and a cache management table, and a read pattern table (address information storage means) 23b embodied by a random access memory (RAM) or a non-volatile memory such as an electrically erasable programmable read-only memory (EEPROM). The read pattern table 23b is embodied by a RAM when only one kind of medium 12 is used and by an EEPROM when a plurality of types of mediums 12 are used. The use of the EEPROM allows the content of the table to survive the turning ON and OFF of the power, as will be described later.

The read pattern table 23b has a read pattern table storage pointer and a read pattern table read pointer. The read pattern table storage pointer indicates a position at which new data is stored, and the read pattern table read pointer indicates a position at which new data is read.

As will be described later, the read pattern table 23b stores a read pattern comprising a read address and a number of blocks read, the address and the number being specified by the read command from the host computer 20. The host computer 20 has a read-only memory (ROM) 24 which stores, as required, a read pattern specified by the read command (described later).

FIGS. 4A and 4B show sequences of processes carried out after the medium is loaded. FIG. 4A shows a process relating to a read command issued after the power is turned ON (or the apparatus is reset) and the medium is loaded. When the medium is loaded, the loading process (loading by the medium loading mechanism 13 and the driving of the SPM 14 into rotation) is carried out, whereupon the apparatus waits for a command for accessing the medium. In this state, the host computer 20 issues a TEST UNIT READY command so as to check whether or not the medium 12 is mounted. When it is found that the medium 12 is mounted, the host computer 20 receives a report accordingly. The host computer 20 then issues a READ CAPACITY command so as to read information relating to the capacity of the medium 12. After the reading is done, the host computer 20 receives a report accordingly.

When the host computer 20 issues a read command that allows an OS to read management area information and the like, a block address (read address) and a processed block size (number of blocks read) are stored in a first area of the read pattern table 23b, the read address and the read block size being specified by the read command. The optical head 16 is positioned so as to read data from a relevant block. The read data is temporarily stored in the buffer 18 and then transferred to the host computer 20. When the data is transferred, the host computer 20 receives a report accordingly.

Subsequently, when a next read command is issued, the block address and the processed block size specified by the read command are stored in the second area of the read pattern table 23b. The optical head 16 is positioned so as to read data from a relevant block. The read data is temporarily stored in the buffer 18 and then transferred to the host computer 20. When the data is transferred, the host computer 20 receives a report accordingly.

When a next read command is issued, the block address and the processed block size specified by the read command are stored in the third area of the read pattern table 23b. The optical head 16 is positioned so as to read data from a relevant block. The read data is temporarily stored in the buffer 18 and then transferred to the host computer 20. When the data is transferred, the host computer 20 receives a report accordingly.

FIG. 4B shows a variation of the process shown in FIG. 4A, wherein a prefetch is performed after the loading of the medium in accordance with the read pattern table 23 storing the block address and the processed block size. Immediately after the medium is loaded and the loading process is carried out, the optical head 16 is positioned in accordance with the block address and the processed block size which address and size are specified in the first area of the read pattern table 23b, so as to read data from a relevant block. The read data is stored in the buffer 18. The buffer 18 address in which the data is stored is registered in a buffer management table in the RAM 23a.

Subsequently, the optical head 16 is positioned in accordance with the block address and the processed block size which address and size are specified in the second area of the read pattern table 23b, so as to read data from a relevant block. The read data is stored in the buffer 18. The buffer 18 address in which the data is stored is registered in a buffer management table (RAM 23a).

The optical head 16 is then positioned in accordance with the block address and the processed block size which address and size are specified in the third area of the read pattern table 23b, so as to read data from a relevant block. The read data is stored in the buffer 18. The buffer 18 address in which the data is stored is registered in a buffer management table (RAM 23a).

While the above-described prefetch process is being carried out, the host computer 20 issues a TEST UNIT READY command for checking whether or not the medium is mounted, and a READ CAPACITY command for reading information relating to the capacity of the medium.

When the host computer 20 issues the first read command, the block address and the processed block size specified by the read command are stored in the cache memory 22. A determination is made as to whether or not the data that corresponds to the first read command, whose content is specified in the first area of the read pattern table 23b, is stored in the buffer 18b. If the corresponding data is stored, that is, if it is found that a cache hit has occurred, the relevant data stored in the buffer 18 is transferred to the host computer 20. When the data has been transferred, the host computer 20 receives a report accordingly.

Likewise, the block address and the processed block size specified by each of the second and third read commands is stored in the cache memory 22. A respective determination is made as to whether or not the data that corresponds to the second and third read commands, whose contents are stored in the read pattern table 23b, respectively, is stored in the buffer 18. If the corresponding data is stored, that is, if a cache hit has occurred, the relevant data stored in the buffer 18 is transferred to the host computer 20. When the data has been transferred, the host computer 20 receives a report accordingly.

FIG. 5 shows the read pattern table. In the read pattern table 23b of FIG. 5, block addresses A1–An, processed block sizes B1–Bn and validity flags F1–Fn are stored so as to constitute first through nth command information sets. Each of the first through nth command information set corresponds to a respective read command issued by the host computer 20 in correspondence with an OS. A validity flag indicates whether or not the command information in an ith ($1 \leq i \leq n$) area in the read pattern table 23b is valid. In a prefetch process, the validity flag is checked.

Since the validity flag requires 2 bytes, the address 4 bytes, and the processed block size 2 bytes, the capacity of the read pattern table 23b may be appropriately set to 80 bytes, enough to hold command information for ten commands. Once the command information sets are stored, elimination of superfluous information and rearrangement are carried out in the table.

Figure 6:
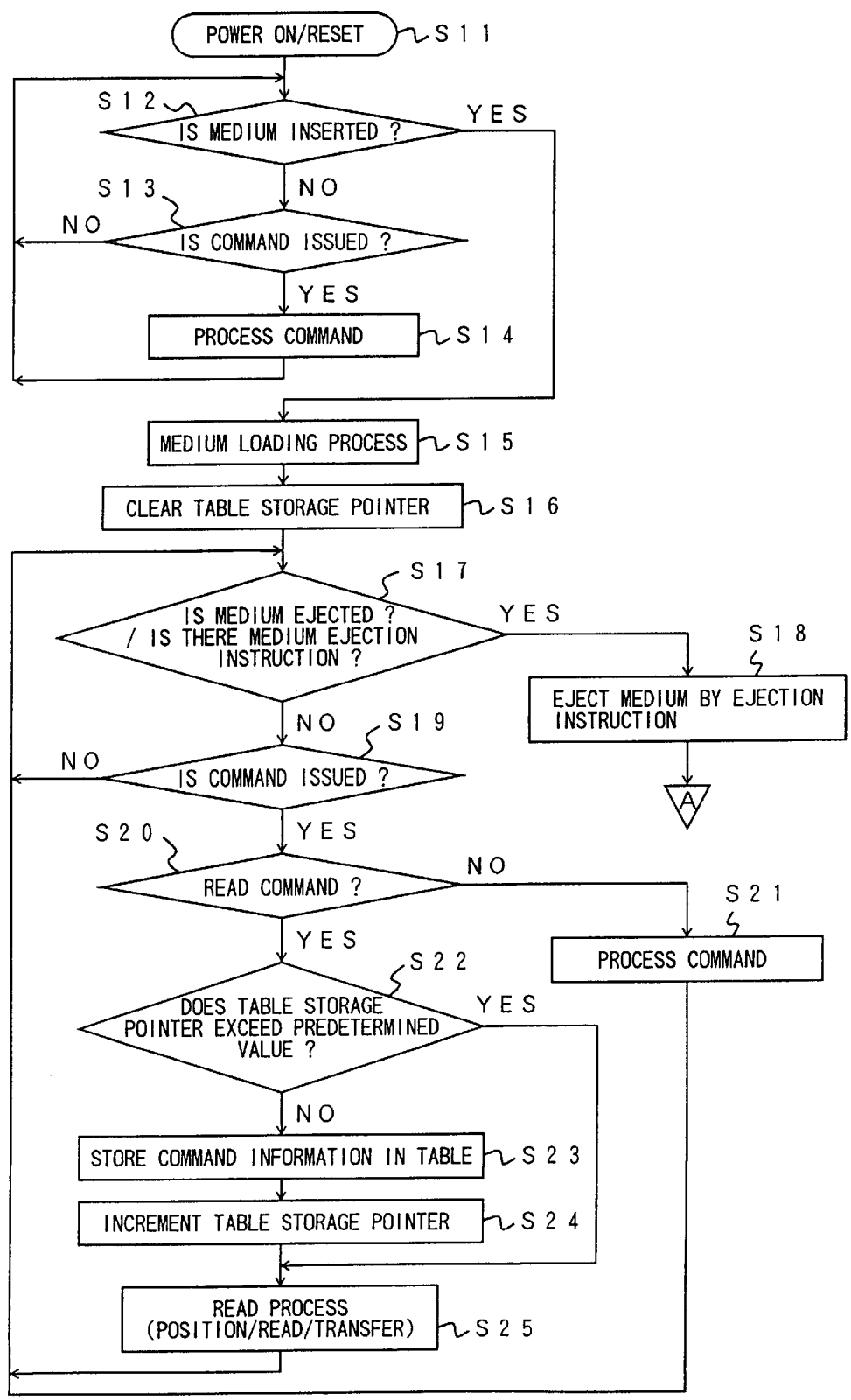
Figure 7:
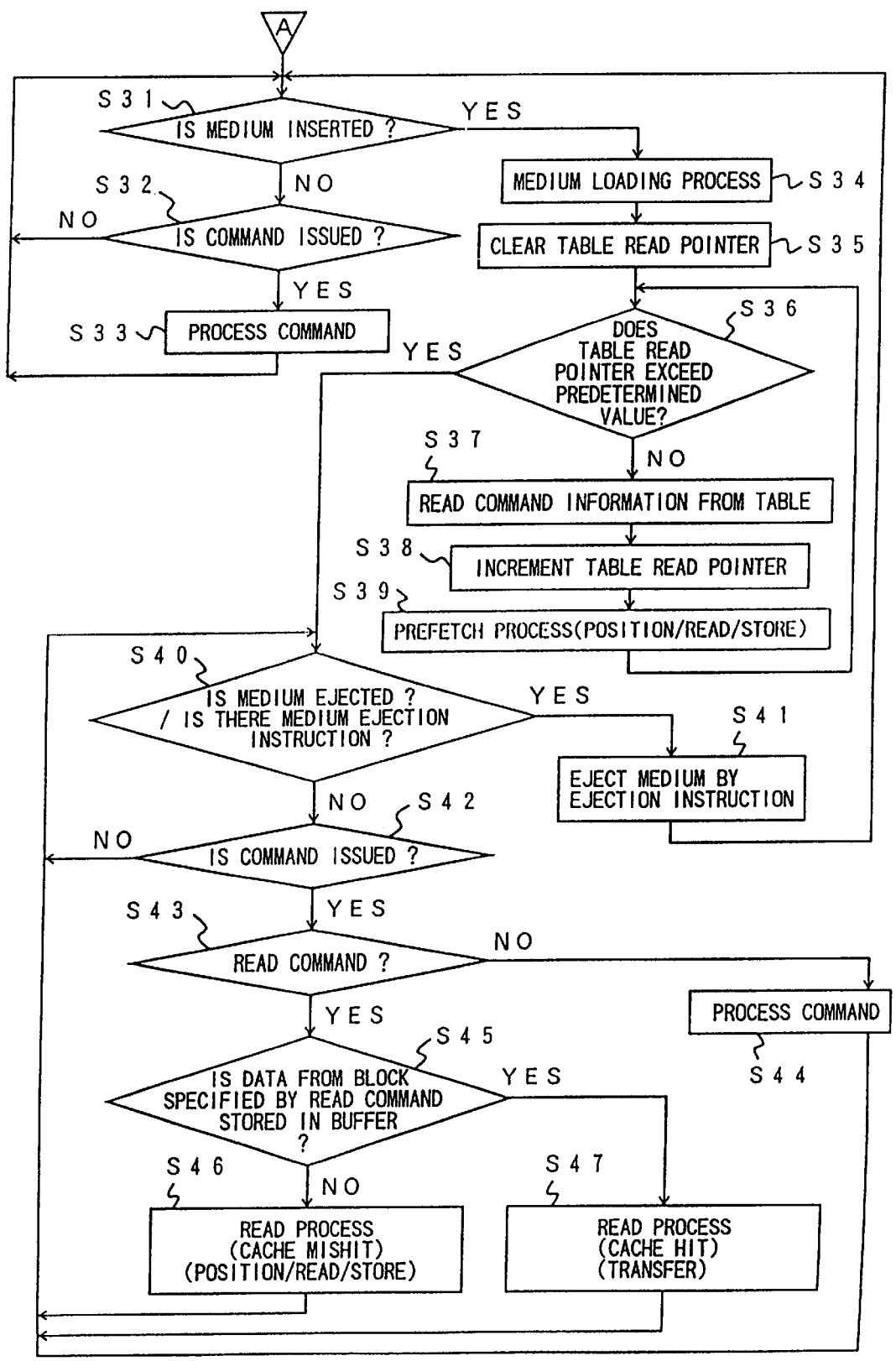
FIG. 7 is a flowchart of the process performed when the medium is loaded for a second time and for subsequent times.

FIG. 6 is a flowchart of the process performed when the medium is loaded for the first time after the power is turned ON. FIG. 7 is a flowchart of the process performed when the medium is loaded for a second time and for subsequent times. In addition, a second medium may be loaded instead of loading the same medium a second time.

Referring to FIG. 6, when the power is turned ON, or when a reset process is performed (S11), a determination is made by the sensor in the medium loading mechanism 13 as to whether or not the medium 12 is inserted (S12). When the medium 12 is not inserted, a determination is made as to whether or not the host computer 20 has issued a command (S13). If a command is issued, the command is processed (S14). For example, in some OSs, a TEST UNIT READY command is issued at predetermined intervals.

If the medium is inserted, the medium loading process including the driving of the spindle motor into rotation is performed (S15), whereupon a read pattern table storage pattern is cleared (S16). A determination is made as to whether or not the medium is ejected, or whether or not there is an instruction to eject the medium (S17). When there is an instruction to eject the medium, the medium is ejected (S18).

When the medium is loaded a second time, the control is turned over to the process flow of FIG. 7.

If it is found that the medium has not been ejected, a determination is made as to whether or not the host apparatus has issued a command (S19). If no command is issued, the apparatus waits for a command. When a command is issued, a determination is made as to whether or not the command is a read command (S20). If the issued command is not a read command, that is, for example, if the issued command is a write command, that command is processed (S21), and the control is returned to S17.

When the first read command is issued, a determination is made as to whether or not the read pattern storage pointer exceeds a predetermined value (S22). If the pointer does not exceed the predetermined value, the address and size of the block that is read is obtained from the read command and stored in the read pattern table as the first command information set, as shown in FIG. 5 (S23), whereupon the read pattern storage pointer is incremented (S24).

Subsequently, if it is determined in S22 that the read pattern table storage pointer exceeds the predetermined value, a read process performed such that the read head is positioned to face the address specified by the read command so as to read data therefrom. The read data is stored in the buffer and then transferred from the buffer to the host apparatus (S25). The control is then returned to S17 and similar processes are repeated until the nth read command is issued and processed.

Subsequently, when the medium for which the process of FIG. 6 is carried out is ejected, the control is turned over to the process of FIG. 7. First, a determination is made by the sensor in the medium loading mechanism 13 as to whether or not the medium 12 is inserted (S31). If the medium is not inserted, a determination is made as to whether or not the host computer 20 has issued a command (S32). If a command is issued, the command is processed (S33).

When the medium 12 is inserted, the medium loading process is carried out (S34). The read pattern table read pointer is cleared (S35), whereupon a determination is made as to whether or not the read pattern table read pointer exceeds a predetermined value (S36). If the pointer does not exceed the predetermined value, the first command information set is read from the read pattern table 23b (S37).

If the validity flag of the first command information set indicates that the command information set is valid, the read pattern table read pointer is incremented (S38). Thereupon, a prefetch process is conducted such that the optical head 16 is positioned so as to read data from a relevant block and the read data is stored in the buffer 18 (S39). The fetch process is repeated until the read pattern table read pointer exceeds a predetermined value (n), that is, until the nth command information set stored is referred to.

When the read pattern table read pointer exceeds the predetermined value, a determination is made as to whether or not the medium 12 is ejected, or whether or not there is an instruction to eject the medium 12 (S40). When there is an instruction to eject the medium 12, the medium is ejected (S41). The control is then returned to S31.

If the medium has not been ejected, a determination is made as to whether or not the host apparatus has issued a command (S42). If no command is issued, the apparatus waits for a command. When a command is issued, a determination is made as to whether or not the command is read command (S43). If the issued command is not a read command, that is, if the issued command is, for example, a write command, that command is processed (S44), whereupon the control is returned to S40.

The buffer 18 is managed by the buffer management table in the RAM 23a. A determination is made according to the buffer management table as to whether or not the data from the block specified by the read command is stored in the buffer 18 (S45). When the relevant data is not stored in the buffer 18, it is found that a cache mis-hit has occurred. Thereupon, a read process is conducted such that the read head 16 is positioned, data is read and stored in the buffer, and the data is transferred (S46). The data thus read can be used if the next command accesses the same address.

When the data relevant to the read command is stored in the buffer 18, it is found that a cache hit has occurred. Thereupon, a read process is conducted such that the data is transferred from the buffer 18 to the host computer 20 (S47).

Similar processes are repeated for a total of n read commands successively issued until the medium 12 is ejected (S40–S47).

In this way, it is possible to respond to a read command from the host computer 20 quickly and attain a high-speed access to the medium after the medium loading process, by storing the pattern of the read command issued from the host computer 20 when the medium loading process is completed for the first time after the power is turned ON or after the apparatus is reset, and by automatically executing the read process according to the read pattern when the medium loading process is completed for a second time and for subsequent times. This scheme is based on the fact that there is only a small variation with the type of OS in the read pattern of the read command issued after the medium loading process.

When there are a number of read commands or when it is known that the memory is easily dissipated, the table may retain information for only one or two medium loading processes. In this case, an access derived from a read command issued immediately after the loading of the medium may be responded by a cache memory so that the an optical system adjustment such as an adjustment of optical power may be carried out meanwhile. In this way, it is possible for a user to obtain data immediately from the medium 12 without being bothered by a time required for the mechanical adjustment.

Although the above description assumes that the data is stored immediately after the loading of the medium, it is also possible to store the data while the apparatus is waiting for a command from the host computer 20.

Figure 8:
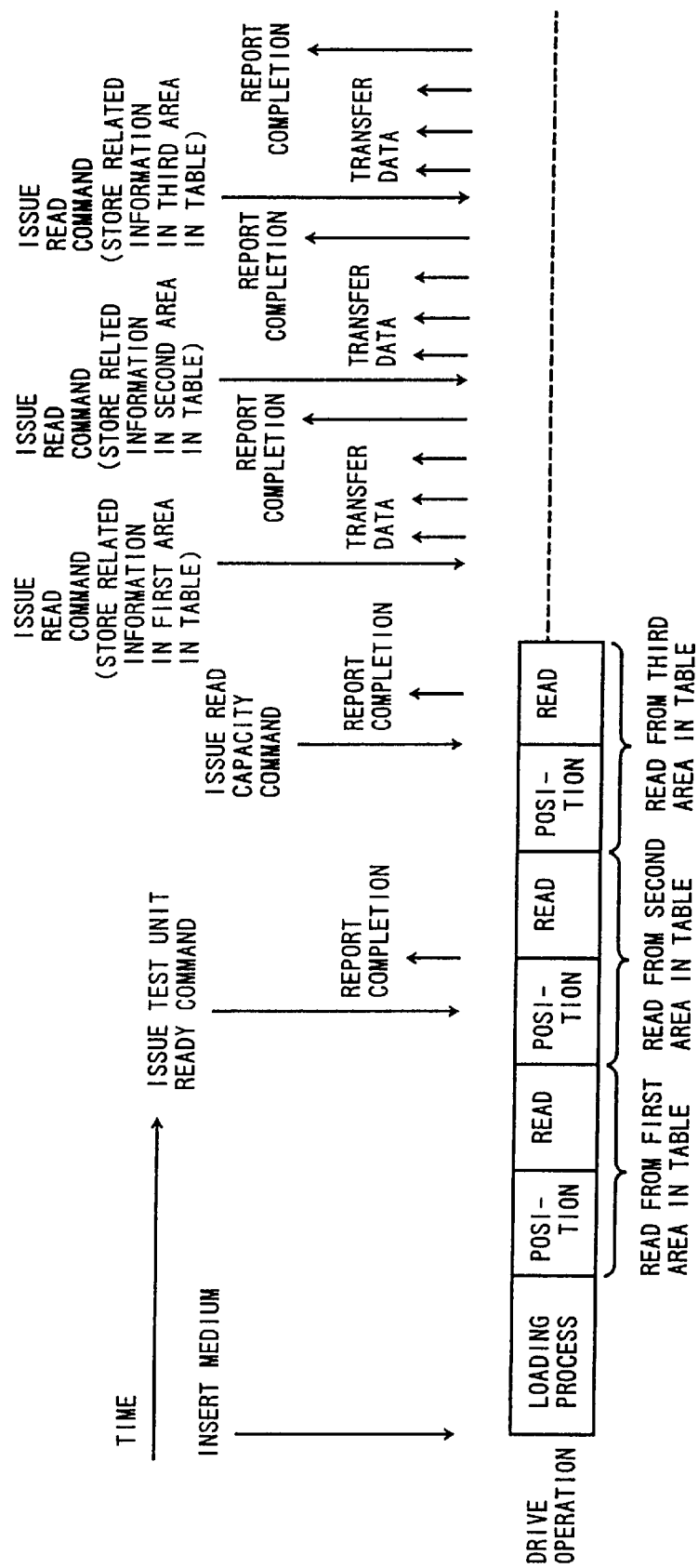
FIG. 8 shows a sequence of the process according to a second embodiment of the present invention carried out after the medium is loaded.

FIG. 8 shows a sequence of processes according to a second embodiment of the present invention carried out after the medium is loaded. FIG. 8 shows a case where the prefetch process is conducted in accordance with the read pattern table 23b after the medium is loaded. The sequence shown in FIG. 8 is based on the sequence of FIG. 4A and corresponds to the sequence of FIG. 4B.

The sequence of FIG. 8 is similar to the sequence of FIG. 4B in that, immediately after the medium is inserted and the loading process is performed, the optical head 16 is positioned in accordance with the block address and the processed block size specified in the first through third areas of the read pattern table 23b, so as to read from a relevant block. The data read by the optical head 16 is stored in the buffer 18.

When the host computer 20 issues the first read command, the block address and the processed block size specified by the read command are stored in the cache memory 22 and stored (overwritten) in the first area of the read pattern table 23b. A determination is made as to whether or not the data that corresponds to the first read command is stored in the buffer 18. If the corresponding data is stored in the buffer 18, it is found that a cache hit has occurred, whereupon the corresponding data stored in the buffer 18 is transferred to the host computer 20. When the data has been transferred, the host computer 20 receives a report accordingly.

Likewise, the block address and the processed block size specified by each of the second and third read commands is stored in the cache memory 22 and in the second and third areas of the read pattern table 23b, respectively. A respective determination is made as to whether or not the data that corresponds to the second and third read commands, whose contents are stored in the read pattern table 23b, respectively, is stored in the buffer 18. If the corresponding data is stored, that is, if a cache hit has occurred, the relevant data stored in the buffer 18 is transferred to the host computer 20. When the data has been transferred, the host computer 20 receives a report accordingly.

To summarize the above, each time a read command is issued by the host computer 20, the information comprising the block address and the processed block size specified by the read command is stored in the read pattern table 23b so as to update the old information.

Figure 9:
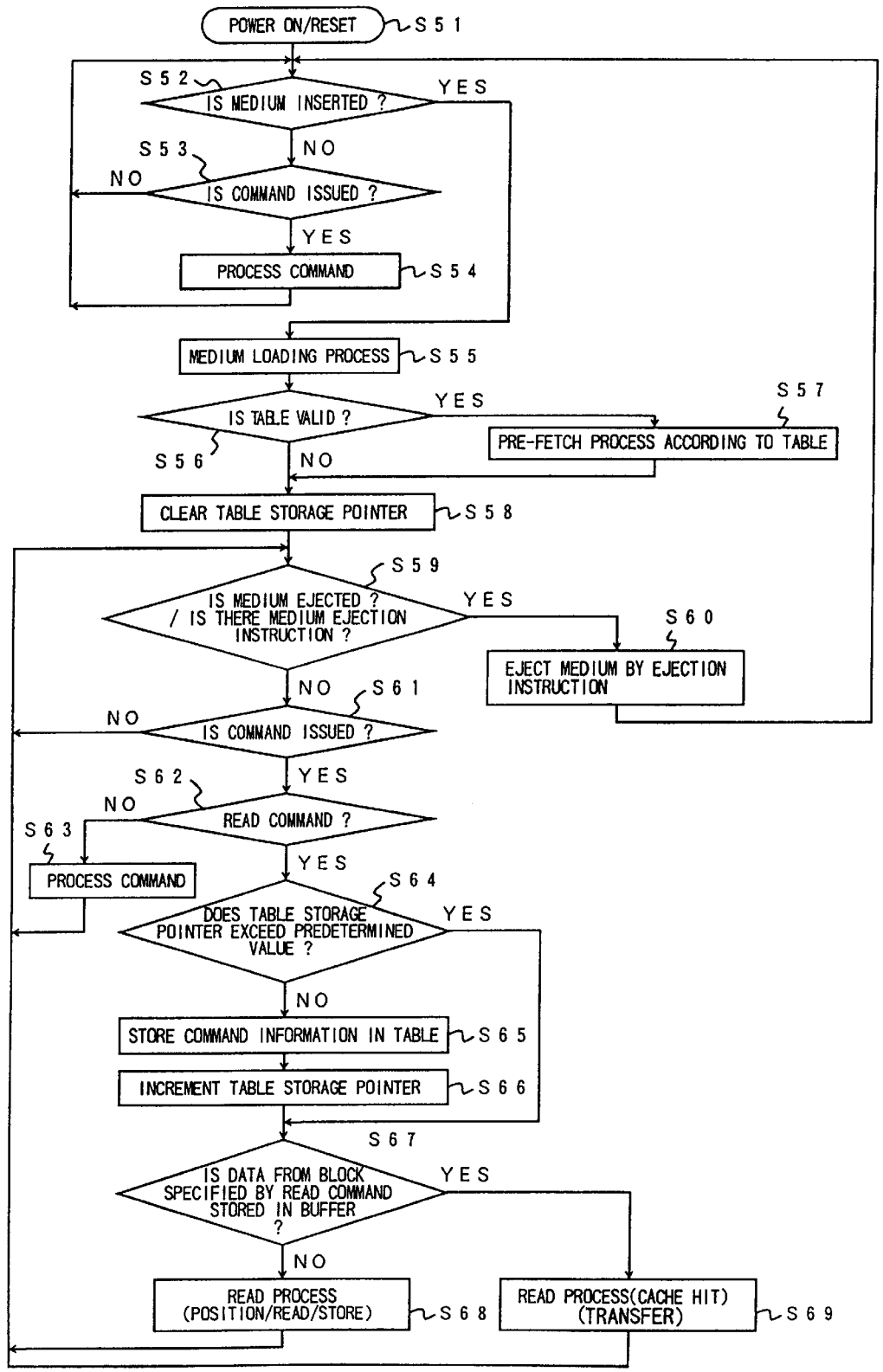
FIG. 9 is a flowchart of the process according to a second embodiment.
Figure 10:
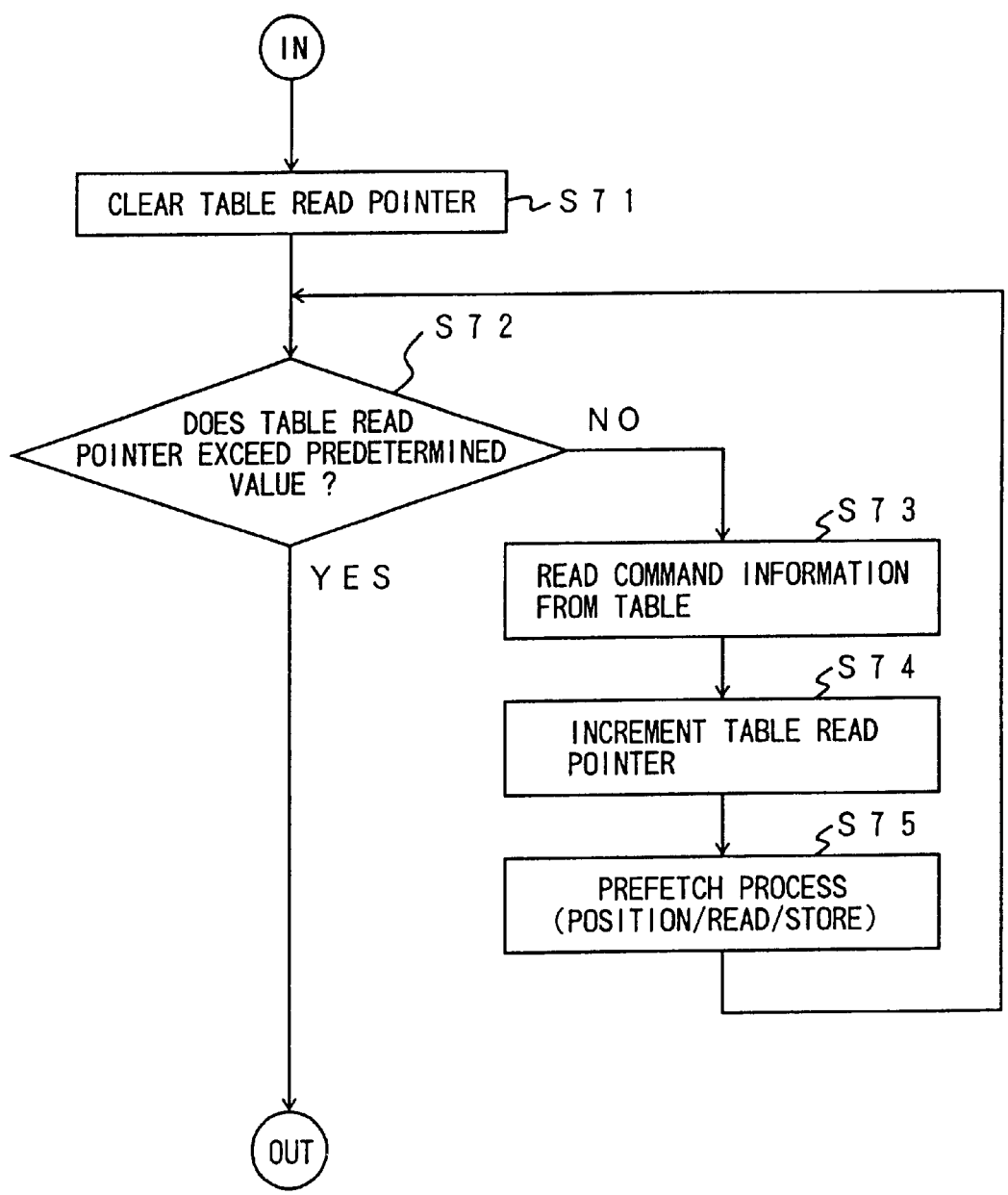
FIG. 10 is a flowchart of the prefetch process according to the second embodiment.

FIG. 9 is a flowchart of the process according to a second embodiment. FIG. 10 is a flowchart of the prefetch process according to the second embodiment. Referring to FIG. 9, after the power is turned ON or the apparatus is reset (S51), a determination is made by the sensor in the medium loading mechanism 13 as to whether or not the medium 12 is inserted (S52). If the medium 12 is not inserted, a determination is made as to whether or not the host computer 20 has issued a command (S53). If a command is issued, the command is processed (S54).

When the medium 12 is inserted, the medium loading process is performed (S55). Validity flags F1–Fn in the read pattern table 23b (see FIG. 5) are referred to (S56). If the flags show that the table is valid, the prefetch process is carried out according to the read pattern stored in the read pattern table 23b (S57, described in detail with reference to FIG. 10).

When the prefetch process is completed, or when it is found that the table is invalid, the read pattern table storage pointer is cleared (initialized) so that the apparatus waits for a command (S58). A determination is made as to whether or not the medium is ejected or whether or not there is an instruction to eject the medium (S59). When there is an ejection instruction, the medium is ejected (S60), whereupon the control is returned to S52.

When the medium is not ejected, a determination is made as to whether or not the host apparatus has issued a command (S61). If no command is issued, the apparatus waits for a command. When a command is issued, a determination is made as to whether or not the issued command is a read command (S61). When the issued command is not a read command, that is, when the issued command is, for example, a write command, that command is processed (S63). The control is then returned to S59.

When a first read command is issued, a determination is made as to whether or not the read pattern table storage pointer exceeds a predetermined value (S64). If the pointer does not exceed the predetermined value, the address and the size of blocks read are obtained from the read command and stored in the read pattern table 23b as the first command information set, as shown in FIG. 5 (S65). The read pattern table pointer is then incremented (S66).

When it is found in S64 that the read pattern table storage pointer exceeds the predetermined value, a determination is made according to the buffer management table as to whether or not the data from the block specified by the read command is stored in the buffer 18 (S67). If the relevant data is not stored in the buffer 18, it is found that a cache mis-hit has occurred. Thereupon, a read process is performed such that the optical head 16 is positioned, data is read and stored in the buffer, and the data is transferred (S68).

When the relevant data is stored in the buffer 18, it is found that a cache hit has occurred. Whereupon a read process is performed such that the data is transferred from the buffer 18 to the host computer 20 (S69).

Similar processes are repeated for a total of n read commands issued until the medium 12 is ejected. Each time the read command is issued, the read pattern table 23b is updated until the table storage pointer reaches the predetermined value, and the predetermined read process is performed (S59–S69).

The prefetch process of S57 in the sequence of FIG. 9 is shown in detail in FIG. 10. The read pattern table read pointer is cleared (S71), a determination is made as to whether or not the read pattern table read pointer exceeds the predetermined value (S72), and the first command information set is read from the read pattern table 23b if the pointer does not exceed the predetermined value (S73).

When the first command information set is found to be valid according to the validity flag, the read pattern table read pointer is incremented (S74). Whereupon, a prefetch process is performed such that the optical head 16 is positioned to a relevant block, data is read and stored in the buffer 18 (S75). Similar processes are repeated for a total of n command information sets, that is, until the read pattern table read pointer exceeds the predetermined value (n).

When the read pattern table read pointer exceeds the predetermined value, the control is returned to S58 of FIG. 9.

In this way, it is possible to respond to a read command from the host computer 20 quickly and attain a high-speed access to the medium after the medium loading process, by storing the pattern of the read command issued from the host computer 20 every time the medium loading process is completed, and by automatically executing the read process according to the read pattern when the medium loading process is completed for a second time and for subsequent times.

Figure 11:
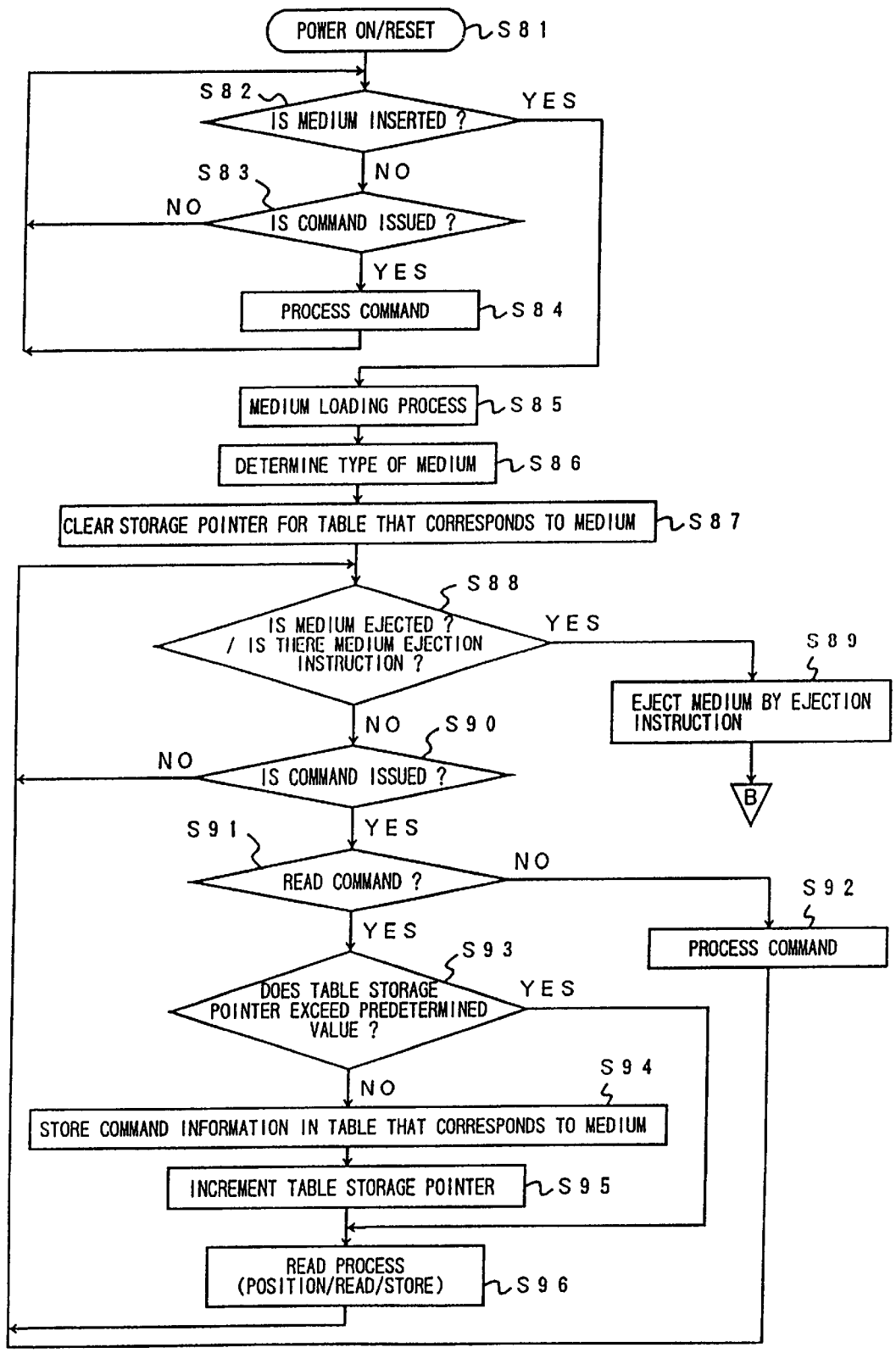
FIG. 11 is a flowchart of the process according to a third embodiment performed when the medium is loaded for the first time.
Figure 12:
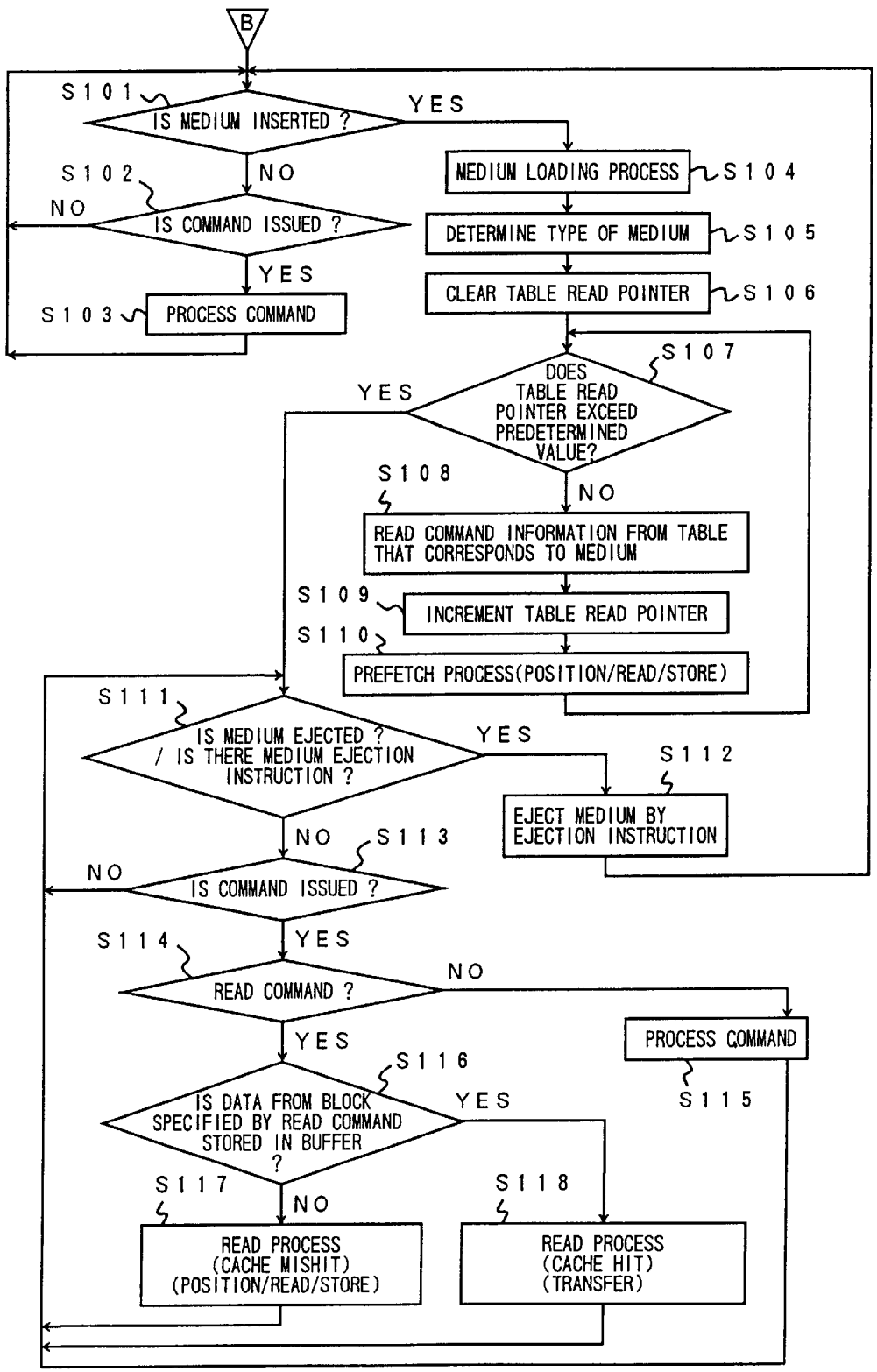
FIG. 12 is a flowchart of the process according to the third embodiment performed when the medium is loaded for a second time and for subsequent times.

FIG. 11 is a flowchart of the process according to a third embodiment performed when the medium is loaded for the first time. FIG. 12 is a flowchart of the process according to the third embodiment performed when the medium is loaded for a second time and for subsequent times.

In the third embodiment, two or more types of mediums 12 having different storage capacity or different physical emboss formats are used in the optical disk apparatus 11. The read pattern table 23b is provided for each of the types of mediums. The information (name of the manufacturer, serial number etc.) relating to the medium type is written in a control track of the medium 12 or written as surface information area (SA) information written in a defect management area (DMA) of the medium 12. The MPU 21 is able to determine the medium type by reading the above information.

Referring to FIG. 11, after the power is turned ON or the apparatus is reset (S81), a determination is made by the sensor in the medium loading mechanism 13 as to whether or not the medium 12 is inserted (S82). If the medium 12 is not inserted, a determination is made as to whether or not the host computer 20 has issued a command (S83). If a command is issued, the command is processed (S84).

When the medium 12 is inserted, the medium loading process including the driving of the spindle motor into rotation is carried out (S85). A determination is then made as to the type of medium inserted (S86). The storage pointer for the read pattern table that corresponds to the medium 12 loaded is cleared (S87). A determination is made as to whether or not the medium is ejected or whether or not there is an instruction to eject the medium (S88). When there is an ejection instruction, the medium is ejected (S89). When a next medium is inserted, the control is turned over to a process B shown in FIG. 12.

When the medium 12 is not ejected, a determination is made as to whether or not the host apparatus has issued a command (S90). If no command is issued, the apparatus waits for a command. When a command is issued, a determination is made as to whether or not the issued command is a read command (S93). When the issued command is not a read command, that is, when the issued command is, for example, a write command, that command is processed (S92), whereupon the control is returned to S88.

When a first read command is issued, a determination is made as to whether or not the storage pointer for the read pattern table that corresponds to the medium 12 loaded exceeds a predetermined value (S92). If the pointer does not exceed the predetermined value, the address and the size of the blocks that are read are obtained from the read command and stored as the first command information set in the read pattern table 23b that corresponds to the medium 12 loaded (S94). The storage pointer for the read pattern table that corresponds to the medium 12 loaded is incremented (S95).

Subsequently, if it is found in S92 that the read pattern storage pointer exceeds the predetermined value, a read process is performed such that the optical head 16 is positioned to an address specified by the read command, data is read and stored in the buffer, and the data is transferred from the buffer to the host apparatus (S96). Thereupon, the control is returned to S88. Similar processes are repeated until the nth read command is issued and processed.

Subsequently, when the medium processed according to the sequence of FIG. 11 is ejected, the control is turned over to the sequence shown in FIG. 12, wherein a determination is first made by the sensor in the medium loading mechanism 13 as to whether or not the medium 12 is inserted (S101). When the medium 12 is not inserted, the a determination is made as to whether or not the host computer 20 has issued a command (S102). If a command is issued, that command is processed (S103).

When the medium 12 is inserted, the medium loading process is performed (S104), and a determination is made as to the type of medium (S105). The read pointer for the read pattern table that corresponds to the medium 12 loaded is cleared (S106). A determination is then made as to whether or not the read pattern table read pointer exceeds a predetermined value (S107). If the pointer does not exceed the predetermined value, the first command information set is obtained from the read pattern table 23b (S108).

If the first command information set is found to be valid according to the validity flag, the read pointer for the read pattern table that. corresponds to the medium 12 loaded is incremented (S109). A prefetch process is performed such that the optical head 16 is positioned to a relevant block, and data is read and stored in the buffer 18 (S110). The prefetch process is repeated for a total of n command information sets stored in the table, that is, until the read pointer for the read pattern table that corresponds to the medium 12 loaded exceeds a predetermined value (n).

When the read pointer for the read pattern table that corresponds to the medium 12 loaded exceeds a predetermined value, a determination is made as to whether or not the medium 12 is ejected or whether or not there is an instruction to eject the medium 12 (S111). If there is an ejection instruction, the medium 12 is ejected (S112), whereupon the control is returned to S101.

If the medium is not ejected, a determination is made as to whether or not the host apparatus has issued a command (S113). If no command is issued, the apparatus waits for a command. When a command is issued, a determination is made as to whether or not the issued command is a read command (S114). When the issued command is not a read command, that is, when the issued command is, for example, a write command, that command is processed (S115). Thereupon, the control is returned to S111.

The buffer 18 is managed by the buffer management table in the RAM 23a. A determination is made according to the buffer management table as to whether or not the data from the block specified by the read command is stored in the buffer 18 (S116). If the data is not stored in the buffer 18, it is found that a cache mis-hit has occurred. A read process is then performed such that the optical head 16 is positioned, data is read and stored in the buffer, and the data is transferred (S117).

If the relevant data is stored in the buffer 18, it is found that a cache hit has occurred, whereupon a read process is performed such that the data is transferred from the buffer 18 to the host computer 20 (S118).

Similar processes are repeated for a total of n read commands issued until the medium 12 is ejected (S111–S118).

Generally, when the storage capacity of one type of the medium 12 differs from that of another type, the address for OS-specific file management information varies depending on the medium inserted. Using the same read pattern table for all the types of mediums invites a drop in the hit rate of the prefetch data. The arrangement of the third embodiment, wherein different read pattern tables 23b are provided for different medium types, resolves the problem of the drop in the hit rate. Of course, like the first embodiment, the arrangement of the third embodiment enables a high-speed access from the host computer 20 to the medium 12 to be performed after the medium is loaded, irrespective of the type of medium.

Figure 13:
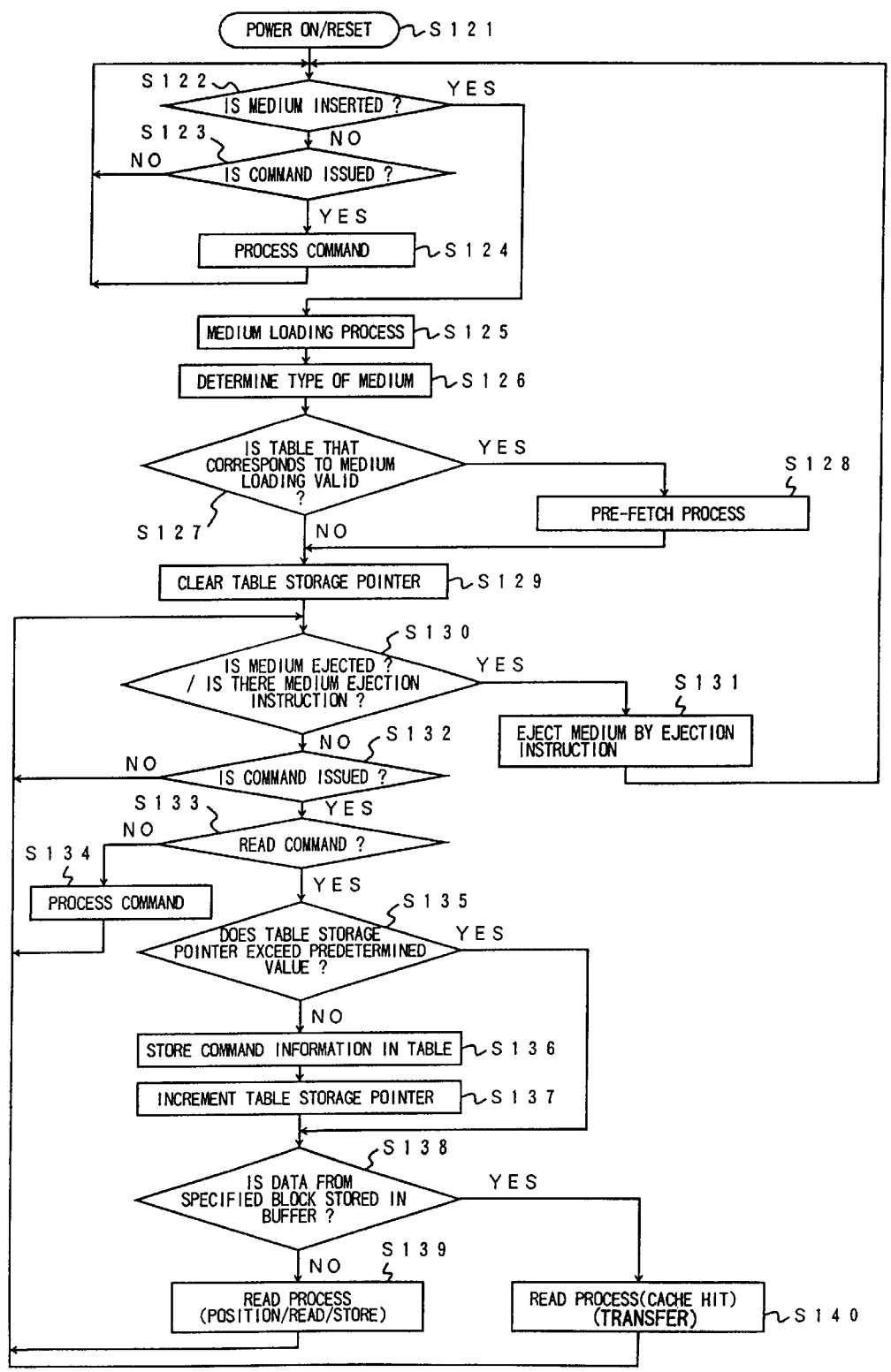
FIG. 13 is a flowchart of a table updating process according to the third embodiment.

FIG. 13 is a flowchart of a table updating process according to the third embodiment. FIG. 13 corresponds to FIG. 9 and shows how the table content is updated when a plurality of types of mediums are used. Referring to FIG. 13, after the power is turned ON or the apparatus is reset (S121), a determination is made by the sensor in the medium loading mechanism 13 as to whether or not the medium 12 is inserted (S122). If the medium 12 is not inserted, a determination is made as to whether or not the host computer 20 has issued a command (S123). If a command is issued, that command is processed (S124).

When the medium 12 is inserted, the medium loading process is performed (S125), and a determination is made as to the type of medium (S126). A determination is made as to whether or not the read pattern table 23b that corresponds to the medium 12 loaded is valid according to the validity flags F1–Fn (see FIG. 5) (S127). If the table is valid, the prefetch process is performed according to the read pattern of the read pattern table 23b that corresponds to the medium 12 loaded (S128). The prefetch process of S128 is the same as the one shown in FIG. 10.

Subsequently, when the prefetch process is completed or when it is found that the table is invalid according to the validity flags, the storage pointer for the read pattern table that corresponds to the medium 12 loaded is cleared (initialized), and the apparatus waits for a command (S129). A determination is then made as to whether or not the medium is ejected or whether or not there is an instruction to eject the medium (S130). If there is an ejection instruction, the medium is ejected (S131), whereupon the control is returned to S122.

If the medium is not ejected, a determination is made as to whether or not the host apparatus has issued a command (S132). If no command is issued, the apparatus waits for a command. When a command is issued, a determination is made as to whether or not issued command is a read command (S133). When the issued command is not a read command, that is, when the issued command is, for example, a write command, that command is processed (S134), whereupon the control is returned to S130.

When a first read command is issued, a determination is made as to whether or not the storage pointer for the read pattern table that corresponds to the medium 12 loaded exceeds a predetermined value (S135). If the pointer does not exceed the predetermined value, the address and the size of the read blocks are obtained from the read command and stored as the first command information set in the read pattern table 23b that corresponds to the medium 12 loaded (S136). The storage pointer for the read pattern table that corresponds to the medium 12 loaded is incremented (S137).

When the storage pointer for the read pattern table is incremented in S137 or when it is found in S135 that the storage pointer for the read pattern table that corresponds to the medium 12 loaded exceeds the predetermined value, a determination is made according to the buffer management table as to whether or not the data from the block specified by the read command is stored in the buffer 18 (S138). If the relevant data is not stored, it is found that a cache mis-hit has occurred. A read process is then performed such that the optical head 16 is positioned, data is read and stored in the buffer, and the data is transferred (S139).

When the relevant data is stored in the buffer, it is found that a cache hit has occurred. A read process is then performed such that the data is transferred from the buffer 18 to the host computer 20 (S140).

Similar processes are repeated for a total of n read commands issued until the medium 12 is ejected. Each time the read command is issued, the content of the read pattern table 23b that corresponds to the medium 12 loaded is updated and a predetermined read process is performed (S130–S140).

In this way, it is possible to respond to a read command from the host computer 20 quickly and attain a high-speed access, irrespective of the type of medium.

FIGS. 14A and 14B show read pattern tables according to a fourth embodiment of the present invention. FIG. 14A shows a read pattern table for a read command issued by the host computer 20 and stored, for example, in the ROM 24 (see FIG. 3). FIG. 14B shows the content of the read pattern table 23b when the prefetch process is performed.

As shown in FIG. 14A, when read commands specifying the addresses 0, 100 and 20 are issued by the host computer 20 in the stated order, a rearrangement is performed in the read pattern table 23b in the optical disk apparatus 11 such that the addresses 0, 20 and 100 are arranged in the stated order. For example, while the optical head 16 has to travel over a distance of 120 in the case of FIG. 14A, it only has to travel over a distance of 100 in the case of FIG. 14B. In this way, the distance that the optical head 16 is made to travel by the positioner 17 is optimized, that is, the overall distance covered during the positioning of the optical head 16 is decreased.

The rearrangement is performed using the cache management technique by shifting the read patter to the cache memory 22. The rearrangement may be carried out immediately after a series of read patterns are stored in the read pattern table upon loading the medium. Alternatively, the rearrangement may be carried out after the next medium loading is completed.

FIG. 15 is a flowchart of the process according to the fourth embodiment performed when the medium is loaded. It is assumed in the description with reference to FIG. 15 that a plurality of types of mediums are used, as in the third embodiment, and the read pattern table is updated each time the read command is issued. However, the flowchart of FIG. 15 is applicable to the first and second embodiments as well.

Referring to FIG. 15, after the power is turned ON or the apparatus is reset (S141), a determination is made by the sensor in the medium loading mechanism 13 as to whether or not the medium 12 is inserted (S142). If the medium 12 is not inserted, a determination is made as to whether or not the host computer 20 has issued a command (S143). If a command is issued, that command is processed (S144).

When the medium 12 is inserted, the medium loading process is carried out (S145). Thereupon, a determination is made as to the type of medium (S146). A determination is made according to the validity flags F1–Fn (see FIGS. 14A and 14B) as to whether or not the read pattern table 23b that corresponds to the medium 12 loaded is valid (S147). If the table is valid, the optimization process shown in FIGS. 14A and 14B is performed (S148). The prefetch process is carried out according to the read pattern of the read pattern table 23b that corresponds to the medium 12 loaded (S149). The prefetch process of S149 is the same as the process shown in FIG. 10.

Subsequently, when the prefetch process is completed or when it is determined that the table is not valid, the storage pointer for the read pattern table that corresponds to the medium 12 loaded is cleared (initialized). Thereupon, the apparatus waits for a command (S150). A determination is regularly made as to whether or not the medium 12 is ejected or whether or not there is an instruction to eject the medium 12 (S151). When there is an ejection instruction, the medium is ejected (S152), whereupon the control is returned to S142.

When the medium 12 is not ejected, a determination is made as to whether or not the host apparatus has issued a command (S153). If no command is issued, the apparatus waits for a command. If a command is issued, a determination is made as to whether or not the command is a read command (S154). If the command is not a read command, that is, if the command is, for example, a write command, that command is processed (S155). Thereupon, the control is returned to S151.

When there is a first read command, a determination is made as to whether or not the storage pointer of the read pattern for the loaded medium 12 exceeds a predetermined value (S156). If the pointer does not exceed the predetermined value, the address and size of the block that is read is obtained from the read command and stored in the read pattern table 23b for the loaded medium 12 as the first command information set (S157), whereupon the read pattern storage pointer for the loaded medium 12 is incremented (S158).

If the read pattern table storage pointer is incremented in S158 and if it is found in S156 that the read pattern table storage pointer for the loaded medium 12 exceeds a predetermined value, a determination is made according to the buffer management table as to whether or not the data from the block specified by the read command is stored in the buffer 18 (S159). When the relevant data is not stored, it is found that a cache mis-hit has occurred. A read process is then performed such that the optical head 16 is positioned, data is read and stored in the buffer, and the data is transferred (S160).

If the relevant data is stored in the buffer 18, it is found that a cache hit has occurred. A read process is then performed such that the data is transferred from the buffer 18 to the host computer 20 (S161).

Similar processes are repeated for a total of n read commands issued until the medium 12 is ejected. Each time the read command is issued, the content of the read pattern table 23b that corresponds to the medium 12 loaded is updated and a predetermined read process is performed (S151–S161).

In this way, it is possible to reduce time required for a seek operation by performing an optimization process. Even if a plurality of types of mediums 12 are used, it is possible to respond to a read command from the host computer 20 quickly and attain a high-speed access, irrespective of the type of medium.

Figure 16A:
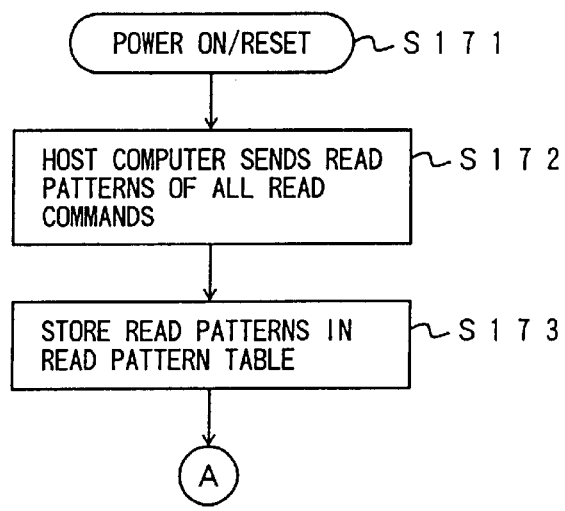
FIG. 16A is a flowchart of the process according to a fifth embodiment.
Figure 16B:
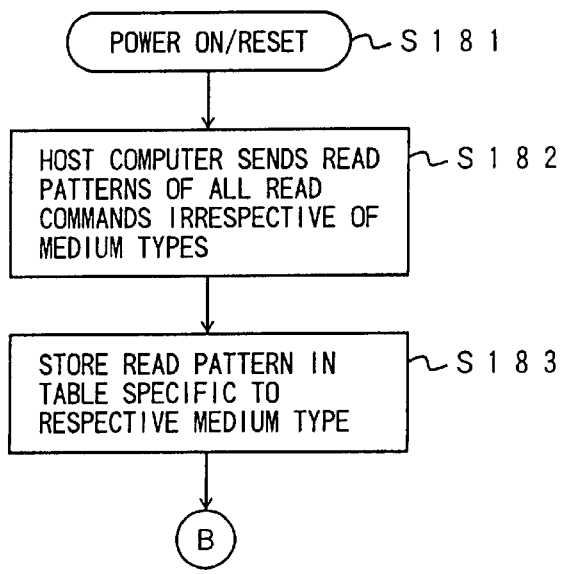
FIG. 16B is a flowchart of the process according to a fifth embodiment.

FIGS. 16A and 16B are flowcharts of the process according to a fifth embodiment. FIGS. 16A and 16B show a case where the apparatus receives en bloc the read patterns (the block address and the processed block size) specified by the read command issued by the host computer 20 to read the OS-specific file management information.

Referring to FIG. 16A, after the power is turned ON or the apparatus is reset (S171), the apparatus receives the read patterns (the block address and the processed block size) specified by all the read commands issued by the host computer 20 (S172). The read patterns received are stored in the read pattern table 23b (S173).

A prefetch process is performed after the medium loading process is completed such that the data is prefetched according to the read pattern in the read pattern table 23b. The prefetch process A indicated in FIG. 16A is the same as the process of FIG. 7.

FIG. 16B shows a case where there are a plurality of medium types. After the power is turned ON or the apparatus is reset (S181), the apparatus receives the read patterns of all the read commands, irrespective of the medium types, issued by the host computer 20 (S182). The read patterns are stored in individual tables, in the read pattern table 23b, each specific to the medium type (S183).

A prefetch process is performed after the medium loading process is completed such that the data is prefetched according to the read pattern of the read pattern table that corresponds to the loaded medium 12. The prefetch process B indicated in FIG. 16B is the same as the process of FIG. 12.

In this way, it is possible to perform the prefetch process upon the loading of the first medium so that the high-speed response of the apparatus is made possible. It is also possible to perform the optimization process as in the fourth embodiment.

Figure 17:
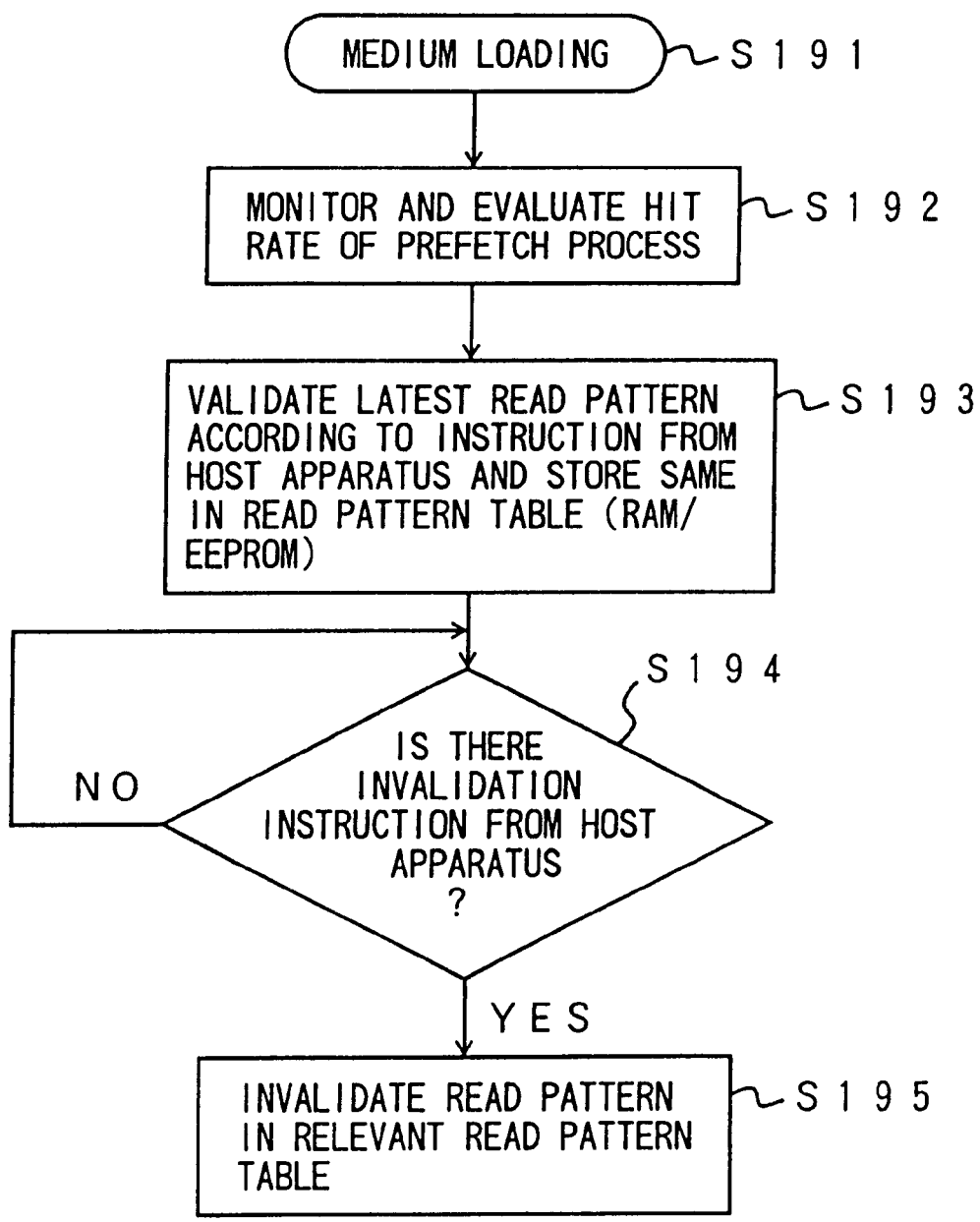
FIG. 17 is a flowchart of the process according to a sixth embodiment for retaining the read pattern.

FIG. 17 is a flowchart of the process according to a sixth embodiment for retaining the read pattern.

The command sequence specific to the OS may vary depending on the medium loaded. If the command sequence varies in an apparatus where a variety of versions of an OS may be started or a plurality of kinds of OSs may be used, the read pattern used in the prefetch process (prefetch pattern) may vary. The sixth embodiment is designed to prevent the hit rate of the prefetched data from dropping and to prevent the performance from being deteriorated because of this variation in the prefetch pattern.

Referring to FIG. 17, the host computer 20 causes the medium loading process to be performed using a most frequently used OS and assuming a most frequently used medium type (S191). The hit rate of the prefetched data is monitored and evaluated for subsequent loading of the medium (S192). In this way, it is possible to arrive at a fetch pattern that allows a most efficient operation.

The fetch pattern that allows a most efficient operation is validated according to an instruction from the host computer 20 and stored in the read pattern table (constituted of a RAM) 23b until the power is turned OFF (S193). The fetch pattern thus validated and stored is latched until the host computer 20 issues (S194) an instruction to invalidate the prefetch pattern. It is possible to latch the relevant prefetch pattern by not modifying the read pattern table 23b until the power is turned OFF.

When the host computer 20 issues an instruction to invalidate the prefetch pattern according to an input by an operator (S194), the read pattern (prefetch pattern) in the read pattern table 23b is invalidated (S195). In other words, the most recent read pattern is designated as the valid pattern until the host computer 20 instructs otherwise. It is of course possible to cause the host computer 20 to monitor the pattern automatically. Alternatively, a controller provided in the optical disk apparatus 1 may be used to monitor the validity of the pattern. When the controller in the optical disk apparatus 11 is employed, the processing power of the host computer 20 remains unexploited.

If the read pattern table 23b is constituted of a non-volatile memory such as an EEPROM or the like, the pattern is latched therein until the host computer 20 issues an instruction to invalidate the pattern stored in the non-volatile memory. This means that immediately after the power is turned ON, the read pattern in the read pattern table 23b is validated. It is of course possible to cause the host computer 20 to monitor the pattern automatically. Alternatively, the controller provided in the optical disk apparatus 11 may be used to monitor the validity of the pattern. When the controller in the optical disk apparatus 11 is employed, the processing power of the host computer 20 remains unexploited.

It is possible to apply the non-volatile memory to an apparatus in which a plurality of types of mediums are used. In this way, it is possible to set a read pattern that allows a most efficient operation, irrespective of the medium.

As has been described, by storing necessary data in a buffer in an optical disk apparatus, it is possible to promptly respond to an access that is made immediately after the medium is loaded, thus providing a time to read control information, adjust the optical system and to prepare for a next access.

Since optical disk apparatus is configured such that data is reproduced using light reflected from an optical disk medium, an error may easily occur due to gathering of fine particles on an optical head or an optical disk medium and due to eccentricity of the optical medium. The present invention is effective in preventing errors and improving access efficiency.

Conceivably, information is reproduced from an optical disk medium in a normal operation and stored data is used only when an error occurs.

It is noted that control information for the medium is stored in a control area. Information specific to the medium, including format information, defect information, read/write optical power information and product number, is also written in the control area.

The present invention is not limited to the above described embodiments, and variations and modifications may be made without departing from the scope of the present invention.

What is claimed is:

1. A data transfer control method for a data storage apparatus in which a recording medium is removable, for transferring data read from said recording medium in accordance with a read command from a host apparatus, said data transfer control method comprising the steps of:

a) storing address information specified by a read command issued by said host apparatus;
   b) reading data from said recording medium in accordance with said address information stored in step a) after a recording medium is loaded and before said host apparatus issues a first read command for said recording medium;
   c) storing said data read from said recording medium in step b); and
   d) updating said address information stored in the step a).

2. The data transfer control method as claimed in claim 1, wherein the address information updated most recently is validated in response to an instruction from said host apparatus, and said validated address information is retained in an address information storage means until an instruction to invalidate said validated address information is issued by said host apparatus.

3. A data transfer control method for an optical disk apparatus in which an optical disk medium is removable, for transferring data read from the optical disk medium in accordance with a read command from a host apparatus, said data transfer control method comprising the steps of:

a) storing address information specified by said read command issued by said host apparatus;
   b) reading data from said optical disk medium in accordance with said address information stored in step a) after said optical disk medium is loaded and before said host apparatus issues a first read command for said optical disk medium;
   c) storing said data read from said optical disk medium in step b); and
   d) updating said address information stored in the step a).

4. A data transfer control method as claimed in claim 3, further comprising:

e) acquiring identification information for identifying said optical disk medium loaded into said optical disk medium storage apparatus; and
   f) storing said information such that said address information is related to said identification information acquired in step e).

5. A data transfer control method for a storage device using removable storage media, the data transfer control method comprising the steps of:

a) storing address information specified by said read command issued by a host apparatus in nonvolatile memory;
   b) reading data from said storage media in accordance with said stored address information upon one of initial powering of the storage device and upon loading of a storage media, wherein said data reading step is performed independently of the host device;
   c) storing said read data; and
   d) periodically updating said address information stored in nonvolatile memory such that said nonvolatile memory stores said address information in accordance with a frequency of access.

* * * * *